(12) United States Patent
Wrigley et al.

(10) Patent No.: US 7,240,268 B2
(45) Date of Patent: Jul. 3, 2007

(54) TEST COMPONENT AND METHOD OF OPERATION THEREOF

(75) Inventors: Christopher E Wrigley, Saffron Walden (GB); Daniel J Coley, Cambridge (GB); Andrew M Nightingale, Cambridge (GB)

(73) Assignee: Arm Limited, Cambridge (GB)

( * ) Notice: Subject to any disclaimer, the term of this patent is extended or adjusted under 35 U.S.C. 154(b) by 816 days.

(21) Appl. No.: 10/448,331

(22) Filed: May 30, 2003

(65) Prior Publication Data

US 2004/0243334 A1 Dec. 2, 2004

(51) Int. Cl.
    *G06F 11/00* (2006.01)
(52) U.S. Cl. .................... 714/739; 714/742
(58) Field of Classification Search ............... 714/739, 714/726, 738, 724; 713/1
    See application file for complete search history.

(56) References Cited

U.S. PATENT DOCUMENTS

| 5,729,554 A | * | 3/1998 | Weir et al. .................. 714/739 |
| 5,862,149 A | * | 1/1999 | Carpenter et al. ........... 714/726 |
| 6,065,116 A | * | 5/2000 | Isaacson et al. ............... 713/1 |
| 6,327,687 B1 | * | 12/2001 | Rajski et al. ............... 714/738 |
| 6,804,803 B2 | * | 10/2004 | Barnhart et al. ............ 714/738 |

* cited by examiner

*Primary Examiner*—David Ton
(74) *Attorney, Agent, or Firm*—Nixon & Vanderhye P.C.

(57) ABSTRACT

A test component and method of operation thereof are provided, the test component being arranged in a test environment to issue a test sequence over a bus to a device under test. A configuration file is provided to specify the behaviour of the test component, the configuration file comprising a plurality of regions with each region specifying attributes for use in determining the test sequence. The method of the present invention comprises the steps of: (a) when a test sequence is required to be issued, causing the test component to select, based on predetermined criteria, one of a number of regions provided by the configuration file; and (b) using the constraint attributes for that selected region to generate the test sequence to be issued on to the bus.

73 Claims, 16 Drawing Sheets

Region Constraints (Master BFM)

Address Range: X to Y
Data: [Fixed, Random, etc]
% Idle: • • • • •

|  | Allowed | Weighting |
|---|---|---|
| Read<br>Write |  |  |
| Single<br>INCR<br>INCR4<br>INCR8 |  |  |
| Byte<br>Word<br>Double |  |  |

Pattern Match (Slave BFM)
Address Range:   X to Y
Master ID:   [Specific IDs or Don't care]
Control Values:   [R/W, Burst, Size of transfer, etc]
Region Constraints (Slave BFM)
| Data: | [Fixed, Array] | |
|---|---|---|
| | Allowed | Weighting |
| OK | | |
| ERROR | | |
| SPLIT | | |
| RETRY | | |
| WAIT CYCLES | | |
FIG. 8
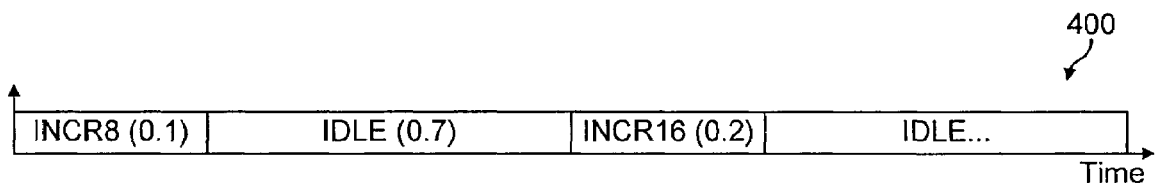
FIG. 9A
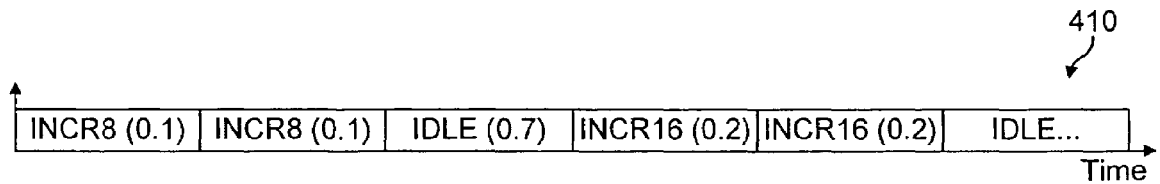
FIG. 9B

TEST COMPONENT AND METHOD OF OPERATION THEREOF

BACKGROUND OF THE INVENTION

1. Field of the Invention

The present invention relates to test components used in a test environment to issue test sequences to a device to be tested, hereafter referred to as a "Device Under Test" (DUT).

2. Description of the Prior Art

When developing components for integration into a system, a number of test procedures are typically performed to ensure that the component will operate in the desired manner when integrated into the system.

The development of a hardware component (also referred to herein as a device) typically takes place in a number of stages. Firstly, the functional operation/behaviour of the component is defined, for example using a Register Transfer Language (RTL). Two popular RTLs used are VHDL and Verilog. In addition, prior to performing such RTL coding, a behavioural model may be built, for example using "System C", to validate at a transactional level that the design intent is correct.

Once an RTL representation of the hardware component has been developed, this is then synthesised into a sequence of hardware elements using any of a number of known synthesising tools. The result of the synthesis is a hardware design that can then be used to produce the actual hardware component, for example using appropriate fabrication of the component on silicon. It would clearly be very costly to perform test procedures on the component once it has actually been reduced to hardware, and instead rigorous testing of the RTL representation of the component is typically performed to ensure that the actual hardware generated from that RTL representation will operate correctly.

Such testing typically involves the provision of a test environment in which the RTL representation of the component to be tested, i.e. the DUT, is incorporated. Further, representations of other devices are also prepared and connected together with the RTL representation of the DUT via a bus. These representations of other devices can take the form of test components within the test environment, which are used to issue test sequences over the bus to the device under test. The waveforms resulting from such test sequences can then be observed either by visual inspection, or by a self-checking mechanism or module integrated into the system simulation providing the test environment.

As designs increase in complexity, the number of states in a given design at any time increases exponentially. For example, in a multi-layer bus system, the number of interconnecting master and slave devices means that the number of paths that would need to be tested is very large compared to a single layer multi-master system. As will be appreciated by those skilled in the art, a master device can be considered to be a device that is designed to initiate transfer requests via the bus, whilst a slave device can be considered to be a device which is a recipient of such transfer requests.

Conventional techniques used for testing single layer systems involve either writing bus functional models (BFMs) for master and slave devices, or re-using existing master and slave components, such as RTL representations of existing processor models and/or slave memory models. One or more of these BFMs or existing components can be used as test components to issue test sequences to the DUT. The test sequences can either be generated manually (for example by programming the processor model) or by generating a pseudo-random test sequence of data.

As systems increase in complexity, for example in the above mentioned multi-layer systems, then a number of issues arise. Firstly, the writing of directed test sequences for such systems is not only time consuming, but also simulation intensive and prone to error, such as, for example, may result from misconfiguration of a BFM. Secondly, the test sequence has low re-usability, and is tightly coupled with the functional coverage required for the particular test environment. For example, manual intervention is required to specify the coverage goals based on a given configuration of the BFM. Accordingly, any functional coverage holes with this approach have to be filled, for example by writing incremental test sequences or by changing the pseudo-random seed. Finally, the flexibility of the approach is limited since, considering an example where a particular processor model is used as the test component for testing the DUT, the available bus transactions may be limited to a subset of the transactions that are actually supported by the bus. It is not possible to dynamically modify the behaviour of the component.

Hence, it is clear that existing techniques give rise to a number of problems, particularly as design complexity increases. In particular, if specific test sequences are written for a particular DUT within a particular test environment, this is very time consuming, and results in large test stimulus files. In addition, it has low re-usability. If instead re-usable test components are provided within the test environment to generate random test sequences, this reduces the time involved in generating specific test sequences, and reduces the size of the stimulus files, but results in test sequences which by their nature are random and do not reflect the actual activities that would be expected within the "real" system.

Verisity (Specman eVC)/Synopsys (Vera based in Designware)/Cadence (with Transaction Verification Modules—TVMs)/Qualis (Design Verification Modules—DVMs) all provide BFMs for verifying bus interconnect. However, for all of these solutions one either has to modify the source code of the BFM or the stimulus input file for each design environment or bus topology that needs to be emulated. Synopsis Vera and Verisity Specman are the most advanced in this respect in that they each have an API for specifying types of transfers that will be generated by their BFMs. The Verisity Specman Elite tool has the ability for the user to program the random generation of test stimulus based on coverage but this is a feature provided by the tool that needs to be manually programmed.

The AMBA Compliance Testbench (ACT) product from ARM Limited allows for the testing of slave port interfaces in active testbench mode, and when performing such testing provides a feature that accelerates coverage collection. This feature allows the specification of a slave memory range in the form of a base address and a maximum size in bytes. The ACT will then generate random burst sequences within the address region specified. The larger the address region given, the more varied the burst length and data sizes used. The burst data sizes that can be chosen are also governed by a separate configuration parameter and can be constrained to a sub-set that are compatible with those supported by the slave under test.

Although directed-random burst transfers to a defined memory region are useful in this context, it is not possible to exactly specify the type and distribution patterns of the generated bursts. Indeed, the bursts are generated in pseudo-random fashion and will only vary between test runs if a different seed is given.

Accordingly, in summary, it can be seen that whilst it is known to provide reusable test components such as BFMs for use in generating test sequences for a DUT, the known techniques for generating pseudo-random test sequences from such test components do not provide testing that accurately reflects the behaviour of the real system. Whilst the writing of specific test sequences can alleviate this problem, this is very time intensive, and results in large stimulus files which have low-reusability. As design complexity increases, it becomes less and less attractive to write specific test sequences.

Accordingly, it is an object of the present invention to provide an improved technique for generating test sequences to be issued over a bus to a device under test.

SUMMARY OF THE INVENTION

Viewed from a first aspect, the present invention provides a method of operating a test component in a test environment to issue a test sequence over a bus to a device under test, a configuration file being provided to specify the behaviour of the test component, the configuration file comprising a plurality of regions with each region specifying attributes for use in determining the test sequence, and a number of said regions specifying constraint attributes defining allowable test sequences, the method comprising the steps of: a) when a test sequence is required to be issued, causing the test component to select, based on predetermined criteria, one of said number of regions provided by the configuration file; and b) using the constraint attributes for that selected region to generate the test sequence to be issued on to the bus.

In accordance with the present invention, a configuration file is provided to specify the behaviour of the test component, this configuration file comprising a plurality of regions with each region specifying attributes for use in determining the test sequence, and a number of the regions specifying constraint attributes defining allowable test sequences. When a test sequence needs to be issued, predetermined criteria are applied in order to select from the configuration file one of the regions that specifies constraint attributes. Then, the test sequence is generated using the constraint attributes for that selected region. The use of such a plurality of regions within the configuration file, and the use of predetermined criteria to determine, when a test sequence is to be issued, which region to select, enables the test sequence generated by the associated test component to be configured to emulate actual bus transactions expected in the real system, without any changes to the source code of the test component. Hence, the invention provides a re-usable test component with an associated re-usable configuration file that can be incorporated into multiple different test environments to mimic activities expected in the real system modelled by the test environment. Hence, the test component can be provided to a user "as is", i.e. in object code form, and does not require user modification. The total stimulus files have been found to be small compared to traditional dynamic tests, and the time taken to write the test sequences is much reduced.

It will be appreciated that when performing the step (a) discussed above reference may be made to the configuration file itself or alternatively the configuration file contents may have been loaded in to memory and so the configuration file itself need not be directly referenced on each occurrence of the step (a).

The configuration file can be arranged such that not all of the regions specify constraint attributes. For example one region may specify attributes which are used in determining a further region to be selected from the configuration file, with for example that further region specifying constraint attributes to be used to generate the test sequence. However, in one embodiment of the present invention, each region in the plurality of regions specifies constraint attributes. Accordingly, each region may potentially be a region selectable by said step (a).

There are a number of ways in which the predetermined criteria can be defined for use in selecting a particular region whose constraint attributes are to be used to generate the test sequence. However, in one embodiment, the plurality of regions in the configuration file are organised in one or more logical groups, each logical group containing one or more of said regions, and wherein each region has a weighting value associated therewith, and said step (a) comprises the steps of: selecting a said logical group; and using as the predetermined criteria at least the weighting values of regions within the selected logical group. The use of such weighting values enables the likelihood of one region being selected in preference to another to be defined so as to mimic the operation of the real component represented by the test component within the test environment.

In the above embodiment, each region has a weighting, even if in many cases that weighting is an implied weighting of a maximum value (100%). At any point where a number of path options exist, then the weighting is used to determine which path to take.

In one embodiment, the attributes of one or more of said plurality of regions comprise requirement attributes defining requirements which must be met to enable selection of those regions, and said step (a) further comprises the step of using as the predetermined criteria requirement attributes in any of the regions within the selected logical group in order to determine whether the requirements specified by those requirement attributes are met. It will be appreciated that the requirements may take a variety of forms. For example, in a multi-master system, a requirement for a particular region may be that a particular master is requesting access to the bus.

In embodiments where the predetermined criteria used in said step (a) to select a particular region employs both the requirement attributes and the weighting values, then in one embodiment the requirement attributes are first analysed to identify any regions within the selected logical group in which the requirement attributes are met, and then assuming that more than one such region is identified, to reference the weighting values when determining which region to select.

In one particular embodiment, said step (a) comprises the step of making a random selection of a region within the selected logical group based on the predetermined criteria. Hence, taking the above example, the weighting values will be taken into account as at least part of the predetermined criteria, but the actual selection will be random, i.e. the selection will not automatically be the region having the highest relative weighting, but instead the selection made will be random and only constrained by the need statistically to select regions in accordance with the weightings. Hence, as an example, if a particular region has a weighting value which indicates that that region should be selected 40% of the time, then the selection of the available regions can be random, but over time should reflect that weighting, such that if a large number of such selection processes were performed, then the particular region having a weighting indicating that it should be selected 40% of the time should in fact be selected 40% of the time.

In one embodiment, at least one of the regions within the selected logical group defines a plurality of possible further processing options available in order to determine the constraint attributes to be used at said step (b), and the attributes of said at least one of said regions comprise decision attributes defining a decision to be made if that region is selected in order to choose between said plurality of possible further processing options. Hence, if a particular region is selected, and if that region has decision attributes associated therewith, then there may be more than one outcome resulting from that selection. Hence, as an example, within a multi-master system, the decision attributes may specify that one identified outcome is to be followed if a particular master is requesting access to the bus, whilst an alternative outcome is to followed if that master is not the master requesting access to the bus.

The outcome may involve selecting another region provided by the configuration file, or may involve adopting the constraint attributes of that selected region as the constraint attributes used to generate the test sequence. Accordingly, said decision attributes may define criteria in which a further selection of regions within another logical group is required at said step (a) in order to select said one of said number of regions whose constraint attributes are to be used at said step (b). Alternatively, if said at least one of the regions has one or more sets of constraint attributes, the decision attributes may define criteria in which one of said sets of constraint attributes should be used at said step (b).

It will be appreciated that there might typically be a plurality of logical groups of regions within the configuration file. However, in one embodiment, the configuration file comprises a single logical group, and each region in said plurality specifies constraint attributes. Hence, in this embodiment, a simple "flat" structure is adopted, where each region is available for selection at said step (a), provided any requirements specified by requirement attributes for that region are met. In an alternative embodiment, rather than the above-mentioned flat structure, he plurality of regions in the configuration file are organised in a tree structure having a plurality of levels, each level containing one or more of said regions in one or more logical groups, such that at least one of the number of regions at a first level of the tree structure is a parent region having one or more child regions depending therefrom at a lower level of the tree structure, and the method comprises the further step of: c) following generation of the test sequence, updating a tree pointer identifying a current level in the tree, such that if the test sequence was generated based on the constraint attributes of a said parent region, the tree pointer then points to a lower level of the tree containing the one or more child regions, thereby ensuring that when the next test sequence is required, said step (a) comprises beginning the selection step from said one or more child regions provided by the configuration file.

By adopting such a tree structure, it is possible to mimic more complex sequences of operation within the test sequences generated by the test component. In particular, particular orderings of transactions can be mimicked by appropriate association of parent and child regions within the tree structure. Hence, for example, if a particular first transaction is always followed in the real system by a particular second transaction, then the region specifying the particular first transaction can be arranged to be a parent region, having a single child region depending therefrom whose constraint attributes specify the particular second transaction. Accordingly, if the region whose constraint attributes specify the particular first transaction is selected, then the above mentioned step of updating the tree pointer will ensure that the next transaction will be based on the constraint attributes of the child region, thereby ensuring that the particular first transaction is followed by the particular second transaction.

It will be appreciated that the test component can take a variety of forms. However, in one embodiment, the test component is a master test component operable to issue as the test sequence a transfer request, and the constraint attributes define allowable transfer requests for the corresponding region.

The constraint attributes may define the allowable transfer requests in a variety of ways. However, in one embodiment, the constraint attributes define an address range for allowable transfer requests and one or more allowable transfer types. Additionally, the constraint attributes may further define one or more allowable burst types. If the burst type used to generate the test sequence specifies multiple transfer requests, then said step (b) preferably comprises the step of generating as the test sequence each of the transfer requests specified by the burst type.

It will be appreciated that in embodiments where the test components is a master test component, it is possible to arrange the regions such that not all regions contain constraint attributes. However, in one embodiment, each region does specify constraint attributes.

In an alternative embodiment, the test component is a slave test component operable to issue as the test sequence a response to a transfer request, and the constraint attributes define allowable responses for the corresponding region.

It will be appreciated that the constraint attributes can define allowable responses in a variety of ways. However, in one embodiment, the constraint attributes define one or more allowable response types. Further, in one embodiment, the constraint attributes further define any allowable wait cycles. Additionally, the constraint attributes may further define allowable data for the response.

As with embodiments where the test component is a master test component, it is possible when the test component is a slave test component for the regions to be arranged such that not all regions contain constraint attributes. However, in one embodiment each region does specify constraint attributes.

In embodiments where the test components is a slave test component, one or more of the regions may specify requirement attributes, and in such embodiments the requirement attributes may comprise pattern match data identifying allowable transfer requests that the associated region can issue a response to, and said step (a) includes a determination of which regions within the selected logical group have pattern match data corresponding to the transfer request to be responded to. This enables particular regions to be set up as defining responses which can be made in reply to particular transfer requests. Hence, in one particular embodiment, the pattern match data will first be analysed to determine those regions within the selected logical group that may be selected, and then the relative weightings of those selectable regions will be referenced when determining which region to select.

In an alternative embodiment, the test component is a bus interconnect test component operable to issue as the test sequence signals to be generated by the bus interconnect itself, and the constraint attributes define allowable signal values for the corresponding region. As will be appreciated by those skilled in the art, a bus interconnect block defines the bus connections between various other devices within a system. The bus interconnect block will hence define the bus infrastructure that allows a number of master devices to access a number of slave devices. In such interconnect blocks, each master may be arranged to access a different sub-set of the slave devices, may be arranged to use different memory maps to those used by other master devices, and further access to each slave device or set of slave devices may be arranged to use one of a number of different arbitration schemes. Accordingly, it will be appreciated that the signals to be generated by the bus interconnect block will take a variety of forms, and will vary for different devices connected to the bus interconnect block.

However, in one embodiment, the test sequence comprises one or more grant signals granting access to the bus to the device under test, and the constraint attributes define allowable grant signals for the corresponding region. In an alternative embodiment, the test sequence comprises one or more slave select signals to the device under test, and the constraint attributes define allowable select signals for the corresponding region. Alternatively, in a further embodiment, the test sequence may comprise one or more bus wait signals to the device under test, and the constraint attributes define allowable bus wait signals for the corresponding region.

Considering the example where the test sequence comprises one or more grant signals, the test environment will typically include a plurality of master logic units that can access the bus. In such embodiments, at least one of the master logic units may be the device under test, and said constraint attributes define to which master logic unit the grant signal is to be issued.

Additionally, in one embodiment, the constraint attributes may further define how long the granted master logic unit will be granted access to the bus.

As with the other embodiments discussed earlier, in the event that the test component is a bus interconnect test component, it is possible that the regions can be defined such that not all of the regions specify constraint attributes. However, in one embodiment, each region does specify constraint attributes.

In embodiments where the test component is a bus interconnect test component operable to issue as the test sequence a grant signal granting access to the bus to the device under test, if one or more of the regions comprise requirement attributes, then the requirement attributes may comprise an identification of allowable master logic units within the test environment that that region can issue the grant signal too.

In one embodiment, at least one of the regions within the selected logical group defines a plurality of possible further processing options available in order to determine the constraint attributes to be used at said step (b), and the requirement attributes of said at least one region have decision attributes associated therewith defining a decision to be made if that region is selected in order to choose between said plurality of possible further processing options.

In one particular embodiment, the decision attributes identify the further processing options to perform dependent on which master logic unit is requesting access to the bus.

As will be apparent from the above discussions, the constraint attributes can take a variety of forms. In addition to the above described forms of constraint attributes, in one embodiment one or more regions may contain constraint attributes which identify a user-defined test sequence, for example by referencing a predetermined file containing a set of user-defined bus transfers for placing on the bus, rather than having constraint attributes which cause the test sequence to be generated randomly based upon constraints.

Irrespective of what form the actual test component takes, one of the aims of the testing procedure is to test the device under test in a wide variety of different scenarios in which the real system may operate. Part of the testing process is to identify any holes in coverage in the testing performed so that the testing can be altered to then cover the identified holes. As will be appreciated by those skilled in the art, the task of changing the test procedures to test any identified holes in coverage is an onerous task.

In accordance with one embodiment of the present invention, the method may further comprise the step of: repeating said steps (a) and (b) a plurality of times to cause multiple test sequences to be issued over the bus to the device under test until a desired level of coverage has been obtained. In preferred embodiments, this is achieved by making changes to the regions within the configuration file, which has been found to be significantly less onerous than seeking to write incremental test sequences with the aim of testing any such coverage holes.

In particular, in one embodiment, the plurality of regions in the configuration file are organised in one or more logical groups, each logical group containing one or more of said regions, and wherein each region has a weighting value associated therewith, and said step (a) comprises the steps of: selecting a said logical group; and using as the predetermined criteria at least the weighting values of regions within the selected logical group; the method further comprising the steps of: monitoring the level of coverage obtained to identify a gap in coverage; and upon identification of a gap in coverage, altering the weighting values associated with the regions to increase the likelihood of that gap being covered during a subsequent iteration of said steps (a) and (b). Accordingly, through the simple act of altering the weighting values associated with certain regions, the likelihood that a particular identified gap in coverage will be covered during subsequent iterations of the testing process can be increased.

As an example, if the gap in coverage is a region that has not been used to generate a test sequence, then the step of altering the weighting values involves increasing the weighting value of that region relative to the weighting values of other regions.

In embodiments where the test component is a master test component, if the gap in coverage relates to an access to a particular slave component, then the step of altering the weighting values may involve increasing the weighting value of those region or regions that have constraint attributes defining an address range for that slave component.

It will be appreciated, given the above examples, that various other alterations can be made to the regions in the configuration files in order to alter the test sequences generated, with the aim of seeking to test any identified coverage holes.

It will be appreciated that the device under test can take a variety of forms. However, in one embodiment, the test component will be either a master test component or a slave test component, and the device under test comprises at least a bus interconnect block.

Viewed from a second aspect, the present invention provides a computer program product comprising test component code portions operable to control a computer to perform the method in accordance with the first aspect of the present invention.

Viewed from a third aspect, the present invention provides a test component for use in a test environment to issue a test sequence over a bus to a device under test, the test component being operable to have access to a configuration file specifying the behaviour of the test component, the configuration file comprising a plurality of regions with each region specifying attributes for use in determining the test sequence, and a number of said regions specifying constraint attributes defining allowable test sequences, the test component comprising: selection logic operable, when a test sequence is required to be issued, to select, based on predetermined criteria, one of said number of regions provided by the configuration file; and generation logic operable to use the constraint attributes for that selected region to generate the test sequence to be issued on to the bus.

BRIEF DESCRIPTION OF THE DRAWINGS

The present invention will be described further, by way of example only, with reference to a preferred embodiment thereof as illustrated in the accompanying drawings, in which:

FIGS. 7 and 8 illustrate an example of a configuration file used in association with a slave BFM in accordance with one embodiment of the present invention;

FIG. 9A illustrates the behaviour that might be expected from a particular master logic unit which is to be modelled;

FIG. 9B illustrates the behaviour that might be obtained when attempting to model that master logic unit using a known prior art technique;

DESCRIPTION OF A PREFERRED EMBODIMENT

Before discussing in detail the testing procedures of embodiments of the present invention, an example of the design of a data processing apparatus for which these testing procedures can be utilised will be discussed with reference to FIG. 1.

Figure 1:
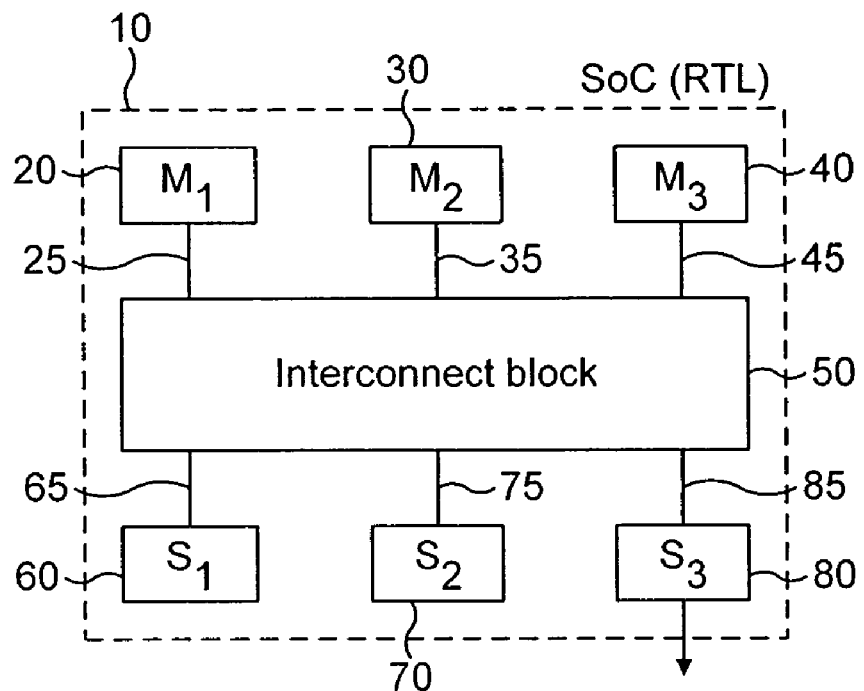
FIG. 1 is a block diagram illustrating an example design of a data processing apparatus.

FIG. 1 illustrates the design 10 of a data processing apparatus taking the form of a microcontroller chip or System on Chip (SoC), which may be used within a device such as a personal organiser, a mobile phone, a television set top box etc. The SoC design 10 of FIG. 1 has a plurality of components 20, 30, 40, 60, 70 and 80 that are interconnected by an arrangement of buses. The actual interconnection of these buses is specified within the interconnect block 50. The interconnect block 50 includes a bus matrix which provides for the interconnection of multiple bus masters and slaves within the SoC 10. Hence, each master device 20, 30, 40 may be connected to corresponding buses 25, 35, 45 respectively, whilst each slave device 60, 70, 80 may also be connected to corresponding buses 65, 75, 85, respectively, with the interconnect block 50 defining how these various buses are interconnected.

For example, each master device may be able to access a different sub-set of the slave devices, and may also use a different memory map. Further, access to each slave or group of slaves may use one of a number of different arbitration schemes. These various parameters will be defined within the interconnect block 50.

The buses interconnecting the various elements will typically operate in accordance with a specified bus protocol, and hence for example may operate in accordance with the "Advanced Microcontroller Bus Architecture" (AMBA) specification developed by ARM Limited.

The whole of the SoC design 10 will typically be defined in RTL, and accordingly each of the components illustrated in FIG. 1 can be considered as a separate RTL component. Each of the RTL components will typically be subjected to rigorous verification testing, either alone, or in combination with other RTL components, by constructing a testbench around those components to provide a test environment for running on a simulator tool. This verification process accounts for a significant proportion of the total design effort. Only once the RTL representations of the various components within the SoC have been sufficiently tested and verified is the SoC design 10 then synthesised into a sequence of hardware elements using a number of known synthesising tools. This results in a hardware design that can then be used to produce the actual hardware SoC.

When performing testing, one or more of the elements of the SoC design will be arranged to form a Device Under Test (DUT), and other components within the test design can then be used as test components to issue test sequences over their respective buses to the DUT. Hence, as an example, if the interconnect block 50 and the three slave devices 60, 70 and 80 are considered to be the DUT, then the master devices 20, 30 and 40 may be used as test components to issue test sequences over the buses 25, 35 and 45, respectively, with the responses then generated by the DUT in reply to these test sequences being monitored in order to determine whether the DUT is operating as expected.

Figure 2:
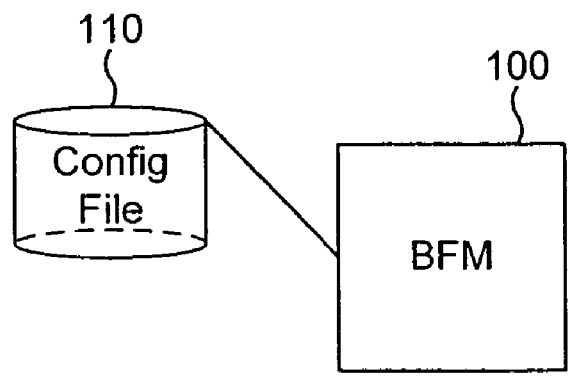
FIG. 2 illustrates a Bus Functional Model (BFM) and its associated configuration file in accordance with one embodiment of the present invention.

It is known to write BFMs for masters and slaves to use as test components in such scenarios. However, one of the limitations of existing approaches is that the BFM code needs to be modified to meet the requirements of the system under test. In accordance with embodiments of the present invention, a new type of BFM is provided as schematically illustrated in FIG. 2, in which the BFM 100 has associated therewith a configuration file 110, the configuration file comprising a plurality of regions with each region specifying attributes for use in determining the test sequence to be issued by the BFM 100. The BFM 100 is re-useable in different systems under test, as are the configuration files. As will be apparent from the later description of the format of the configuration file, and in particular the regions contained therein, this novel test component structure enables the BFM to generate as a test sequence an arbitrary duration sequence of transactions, which can be constrained to mimic in its random behaviour the behaviour of the real component represented by the BFM. Some advantages of this approach are that, without any changes to the source code, the BFM can be configured to emulate actual components, for example a processor core, a Direct Memory Access (DMA) master, a Liquid Crystal Display (LCD) controller, etc. Further, the BFM can be delivered "as is" in object code format, and does not require user modification. Further, the total stimulus files are very small compared to traditional dynamic tests, and the time taken to write the tests is much reduced when compared with traditional techniques.

Figure 3:
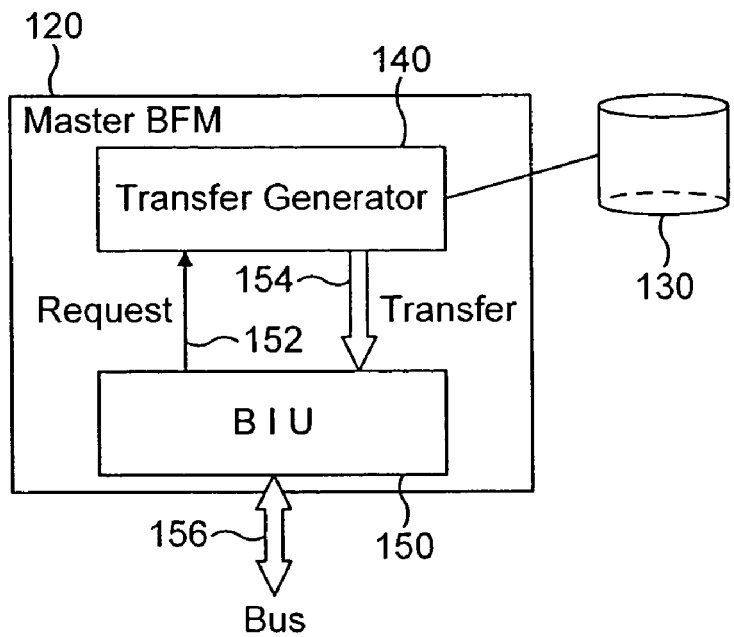
FIG. 3 illustrates a master BFM and its associated configuration file in accordance with one embodiment of the present invention.

FIG. 3 illustrates in more detail the construction of a master BFM 120 in accordance with embodiments of the present invention. The master BFM 120 will be connected via a bus 156 to a device under test, and will contain a Bus Interface Unit (BIU) 150 for interfacing with the bus 156. When it is determined that a transfer request needs to be issued by the master BFM 120, the BIU 150 will issue a request signal over path 152 to a transfer generator 140 within the master BFM 120. The transfer generator 140 will then cause the configuration file 130 to be referenced in order to select one of the regions within the configuration file. That region will contain constraint attributes defining allowable transfer requests, and based on that information, the transfer generator 140 will cause a particular transfer request conforming to the allowable transfer requests defined by the constraint attributes to be routed via path 154 to the BIU 150, for output onto the bus 156.

Figure 4:
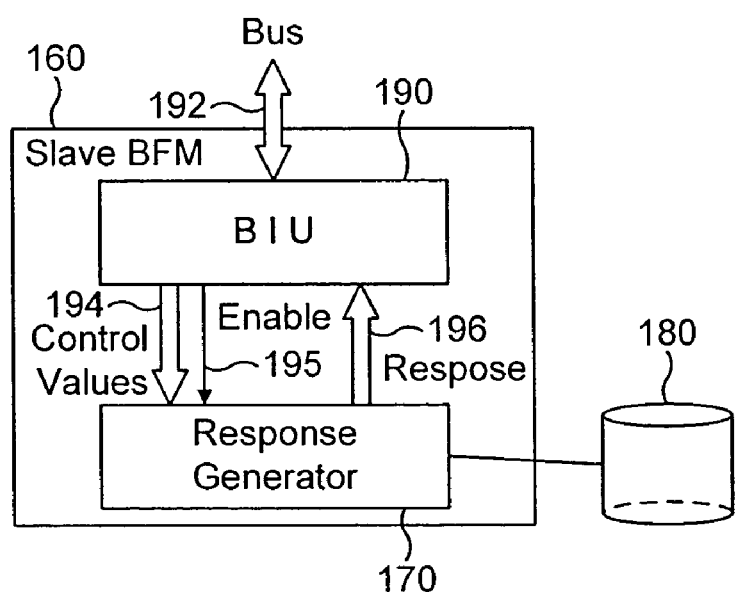
FIG. 4 illustrates a slave BFM and its associated configuration file in accordance with one embodiment of the present invention.

FIG. 4 is a diagram illustrating in more detail the arrangement of a slave BFM 160 in accordance with an embodiment of the present invention. Slave BFM 160 is operable to issue as a test sequence a response to a transfer request, and the constraint attributes specified within regions of the configuration file 180 define allowable responses for each corresponding region. Hence, when a transfer request is received by the BIU 190 over the bus 192, various control values pertaining to that transfer request will be routed over path 194 to the response generator 170, along with an enable signal over path 195. Based on the control values, the response generator 170 will reference the configuration file 180 in order to select a region whose constraint attributes will be used in generating a suitable response.

As will be discussed in more detail later, certain regions may have requirement attributes associated therewith defining requirements which must be met to enable selection of those regions, and the control values pertaining to the transfer request will typically be used to determine whether any such requirements are met in association with those regions. Only if the requirements are met will the corresponding region be selectable as the region whose constraint attributes are used to generate the response. When a region has been selected, the response generator 170 will cause a response to be issued over path 196 to the BIU 190, that response conforming to the constraint attributes specified by the selected region. The BIU 190 will then cause the response to be output over the bus 192.

It will be appreciated that the BFM of preferred embodiments of the present invention can also be used to model other test components other than masters or slaves, and indeed as will be discussed later in more detail could be used to model a bus interconnect block such as the interconnect block 50 illustrated in FIG. 1.

Figures 5, 6:
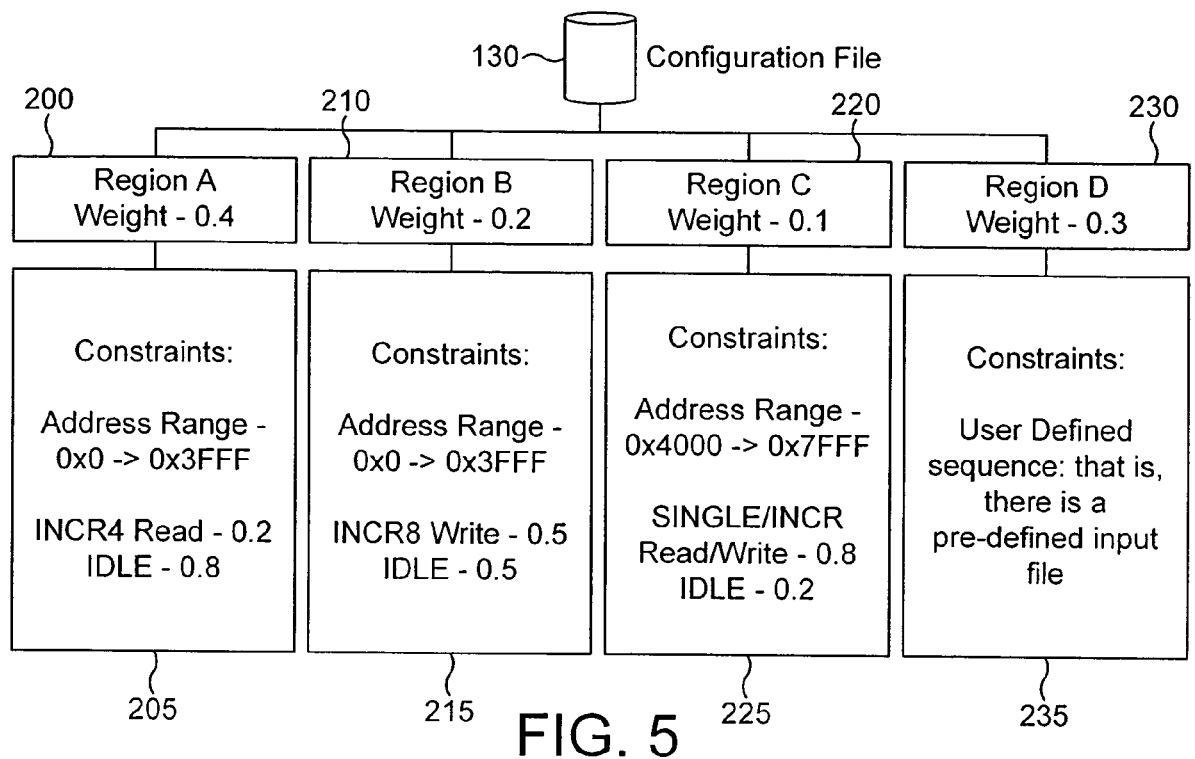
FIGS. 5 and 6 illustrate an example of a configuration file used in association with a master BFM in accordance with one embodiment of the present invention.

FIG. 5 and FIG. 6 illustrate the format of the configuration file 130 that may be used in association with a master BFM 120. As shown in FIG. 5, the configuration file 130 is defined such that it is made up of a number of regions 200, 210, 220, 230, each region specifying a number of constraint attributes 205, 215, 225, 235, respectively. The region constraint attributes that are used in one embodiment for a master BFM are illustrated in FIG. 6. Hence, the constraint attributes will typically identify an address range for allowable transfer requests, i.e. a range of memory addresses in respect of which the associated transfer request can be issued. Further, the data to be associated with that transfer request can be defined by the constraint attributes, and may for example be a fixed value, a random value, some hash function of some other relevant value, for example the address, a reference to a user-defined sequence of transactions, etc.

In addition, the region constraint attributes will in the embodiment illustrated in FIG. 6 identify the amount of time that the master will be idle, rather than actively issuing a transfer request. This is useful, as in real systems master devices will not actively issue transfer requests each time they are entitled to have access to the bus, and instead idle cycles will be inserted. The percentage of time the master device modelled by the BFM will be idle will depend upon the particular master device, and hence through appropriate setting of this value within the constraint attributes, the actual master can be more closely modelled by the BFM.

Further constraint attributes set within the regions are transfer type, i.e. read, write, and allowable burst types, i.e. "single" (i.e. no burst) or "Incr" (i.e. a burst). In FIG. 6, three different types of burst operation are identified, namely Incr, Incr 4 and Incr 8. An Incr is a burst type of undefined duration where the address is incremented according to the data size on each iteration of the transfer request, whilst Incr 4 is a burst type lasting for four transfers, and Incr 8 is a burst type lasting for eight transfers, as defined in the publicly available AMBA specification produced by ARM Limited. Also specifiable within the constraint attributes is a data size type identifying whether the transfer requests are performed in relation to bytes, words, or double words. Additionally, it will be seen that along with each transfer type, burst type, or data size type, a weighting can be associated indicating the amount of time that each instance of that type is used. Within each particular type, the weightings will add up to 100%, and accordingly, considering the transfer type as an example, the weightings may specify the reads are performed 50% of the time and writes are performed 50% of the time. Similarly, considering the burst types, the weightings may be set such that Incr 8 bursts are performed 75% of the time and Incr 4 bursts are performed 25% of the time, in this scenario no single transactions or Incr transactions taking place.

It should be noted that in the embodiment described, these weightings take no account of the idle time of the master, which is instead set separately as mentioned earlier. Hence, if considering the above example, the master BFM is to be idle 50% of the time, then in reality reads will only occur 25% of the time, writes 25% of the time, and the other 50% will be idle transactions.

Returning to FIG. 5, it will be seen that each of the regions has a weighting associated therewith, which defines the likelihood of that region being used in the test generation. In the example illustrated in FIG. 5 where a "flat" structure of regions is employed (and no requirement attributes are specified), then the sum of all the region normalized weightings adds up to "1". Hence, as can be seen from FIG. 5, region A 200 has a weighting of 0.4, i.e. should be selected 40% of the time, region B 210 has a weighting of 0.2, i.e. should be selected 20% of the time, etc. FIG. 5 then gives examples of constraint attributes 205, 215, 225, 235 that are defined as discussed earlier with reference to FIG. 6. Hence, considering as an example the constraint attributes 205, these specify a particular address range, specify that the master will be idle 80% of the time (as indicated by the weighting of 0.8), and that for the other 20% of the time the master will generate Incr 4 read bursts (i.e. in the table illustrated in FIG. 6 the read transfer type will have had a weighting of 100% and the Incr 4 burst type will have a weighting of 100%).

The constraint attributes 215 and 225 are defined in a similar manner. It will also be noted by the constraint attributes 235 that a user defined transfer sequence can specifically be defined with reference to an appropriate format input file identified by the constraint attributes, this allowing a particular desired test sequence to be performed when that region is selected, as may be desired in order to test, for example, a particular coverage hole, or to replicate a particular sequence of transactions of interest which cannot easily be replicated by random sequences.

It should be noted that the regions can be overlapping, in that the address ranges can be coincident or the same address can appear in multiple regions. Further, any particular region can consist of a single address only, which can be useful if a particular address will provide a different response to the rest of the addresses in the memory map. Furthermore, specific address bits can be fixed, this process being referred to as "address striping". This is particularly useful for maintaining data coherency in a multi-master system. For example, by partitioning an address never access the same individual addresses, this can ensure that multiple masters can access the same slave device without corrupting each other's data.

Hence, considering FIG. 5, it can be seen that regions A 200 and B 210 are overlapping and have been configured to performed different types of transfers/bursts. Region C 220 specifies a different address range and has been configured to perform transfers/bursts different to the other regions, whilst region D 230 is a user defined region, which when selected causes the user defined test sequence to be executed instead of a random sequence.

Thus, when a test sequence is requested, a region is randomly selected based on the weightings, and a transfer/burst is randomly generated based on that region's constraint attributes.

Figure 7:
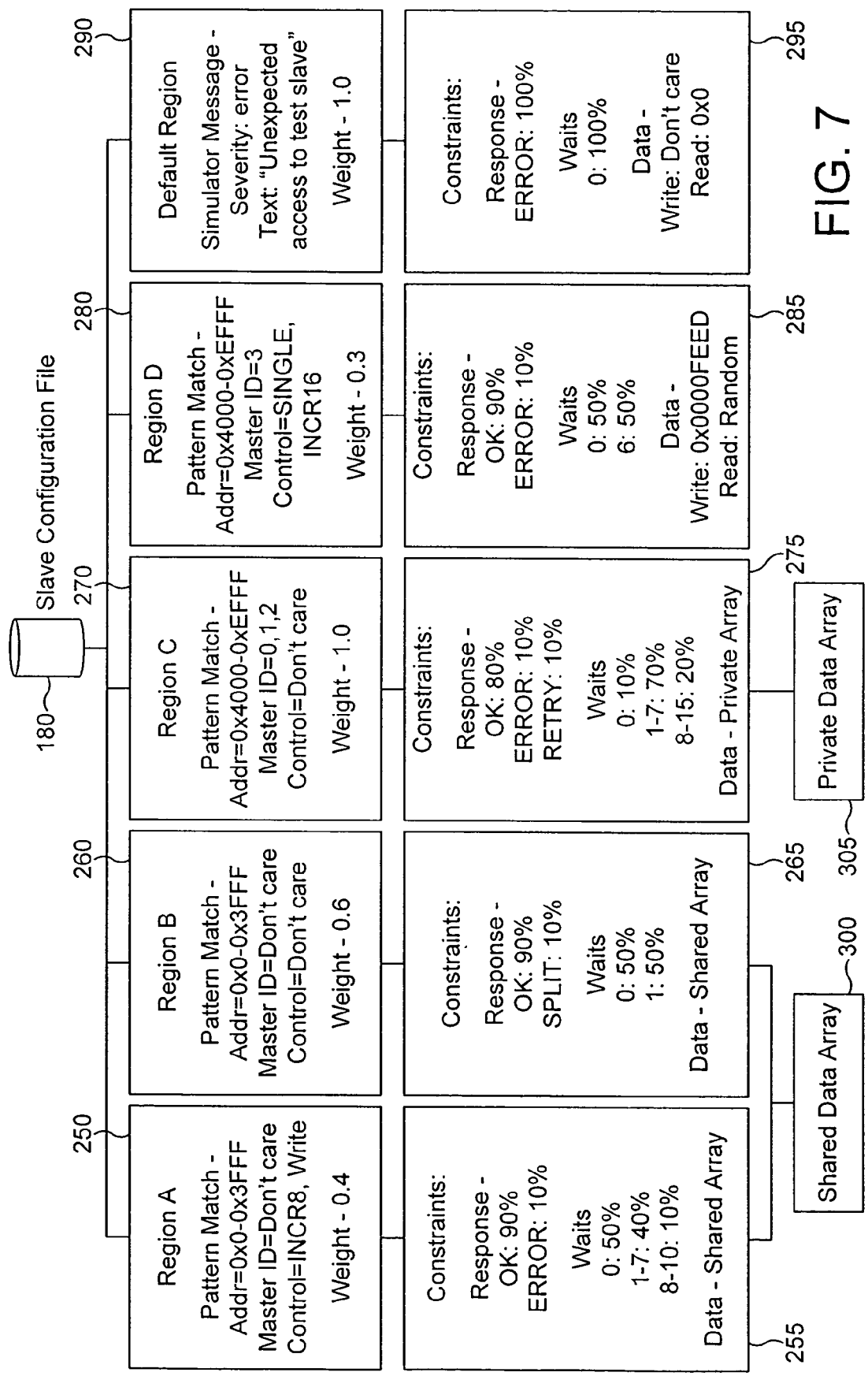

FIGS. 7 and 8 illustrate the format of the configuration file 180 which may be used with a slave BFM 160 in accordance with embodiments of the present invention. As with the configuration file 130 used for master BFMs, the configuration file 180 will comprise a plurality of regions 250, 260, 270, 280, 290, each specifying constraint attributes 255, 265, 275, 285, 295, respectively. Additionally, each of the regions is able to specify requirement attributes in the form of pattern match data identifying allowable transfer requests that that region can issue a response to.

As illustrated in FIG. 8, the pattern match data may specify an address range that must appear within the transfer request in order for that region to be a candidate region to be used in generating a response, and in addition may specify one or more master identifiers, identifying particular masters that must be issuing the transfer request if that region is to be selectable as a region for issuing a response. Further, certain control values that must be present within the transfer request can be specified, such as whether the transfer request specifies a read or a write, a particular type of burst, a particular size of transfer, etc. Hence, as an example, it can be seen that both region A 250 and region B 260 specify the same address range within their pattern match data, and both specify that it does not matter which master is issuing the transfer request. However, region A 250 specifies that the control values must identify an Incr 8 write transfer request, whilst in region B 260 it does not matter what the control values are.

As mentioned earlier with reference to FIG. 5, for any region selection process, the normalised weightings should add up to 1. In the example of FIG. 7 where requirement attributes have been added, this means that for any region selection process where weightings are applied, the weightings of all valid regions (i.e. those whose requirement attributes have been met) should be normalised so that the sum of all normalised weightings is 100%, and the random selection is then based upon those normalised values.

Looking now at the constraint attributes, as can be seen from FIG. 8 these include a specification of the data to be output as part of the response. The data may be specified with reference to a shared array 300, for example a read/write (i.e. RAM-like) data store which can be accessed by multiple regions, or by a private array 305, taking the form of a read/write data store which can be accessed by only one region. Hence, it can be seen that the constraint attributes 255, 265 identify the data with reference to shared array 300, whilst the constraint attributes 275 specify the data with reference to the private array 305.

As is apparent from the constraint attributes 285 and 295, the read data can alternatively be specified as being a randomly generated value, or can be a particular specified value, such as the value 0x0identified in the constraint attributes 295. It will also be noted from the constraint attributes 285 and 295 that certain constraints can be placed on any write data specified by the transfer request being responded to by the slave BFM. If a specified value is given, such as is the case for the constraint attributes 285, then the slave BFM will be arranged to issue a warning to the simulator if the write data received in the transfer request does not match this specified value. Alternatively, if the write value in the constraint attributes is specified to be "don't care" then no checking of the write data will be performed.

Although not illustrated in FIG. 7, it is also envisaged that if read data is required to be issued as part of the response generated by the slave BFM, then as an alternative to the above described types of data, the read data could instead be defined as being "hashed", in which event a read data value will be returned which is a direct function of the incoming control values.

As shown in FIG. 8, the constraint attributes also define one or more allowable response types, such as "OK", "Error", "Split" or "Retry". Further, the constraint attributes will define any allowable wait cycles. As shown in FIG. 8, weightings can be associated with both the allowable response types, and the allowable wait cycles, and in preferred embodiments the weightings of the various response types will add up to 100%, and the weightings of the various wait cycles will add up to 100%. Hence, as for example shown with reference to the constraint attributes 255, if region 250 is selected, it will issue as its response an "OK" signal 90% of the time and an "Error" signal 10% of the time. Further, for 50% of the time, no wait cycles will be inserted, whilst for 40% of the time a number of wait cycles between 1 and 7 will be inserted prior to the response being generated, and for the remaining 10% of the time 8 to 10 wait cycles will be inserted prior to the response being generated.

Also shown in FIG. 7 is the use of a default region 290, which is able to specify a message to be passed to the simulator, in this example, the message indicating to the simulator that an unexpected access to a test slave has taken place. In this particular example this default region will have a default weighting of 1, since this region will always and only be selected if the transfer request does not meet the requirements of any other region.

The above concept of regions means that on average the transaction sequence generated by the BFM meets the user's requirements. However, the order in which these transactions occur is random. For example, if the behaviour of an LCD controller performing DMA data accesses across the bus were to be modelled, the behaviour over time might be expected to resemble the behaviour 400 illustrated in FIG. 9A. From FIG. 9A, it can be seen that the LCD controller will perform bursts of transfers followed by long sequences of IDLEs. With the region concept as described so far, the test sequence generation will not guarantee the above sequence of events. Instead, the sequence 410 illustrated in FIG. 9B might be obtained if the master BFM 120 were used to represent the LCD controller. From FIG. 9B, it can be seen that the BFM 120 may perform back-to-back Incr transfers. Whilst on average this is going to represent the bandwidth requirements of the LCD controller, it does not model accurately the actual behaviour pattern of the LCD controller. It should be noted that it is possible to hit the required behaviour, but it may take a long period of time and generate invalid data sequences.

An additional limitation of the above-described region concept where a flat structure of regions is employed is that it is possible to get undesirable back-to-back transaction sequences which might not be allowed by the particular system being modelled. For example, the system might allow both Incr 8 and Incr 16 transactions, but may specify that they should not occur back-to-back.

Figure 10:
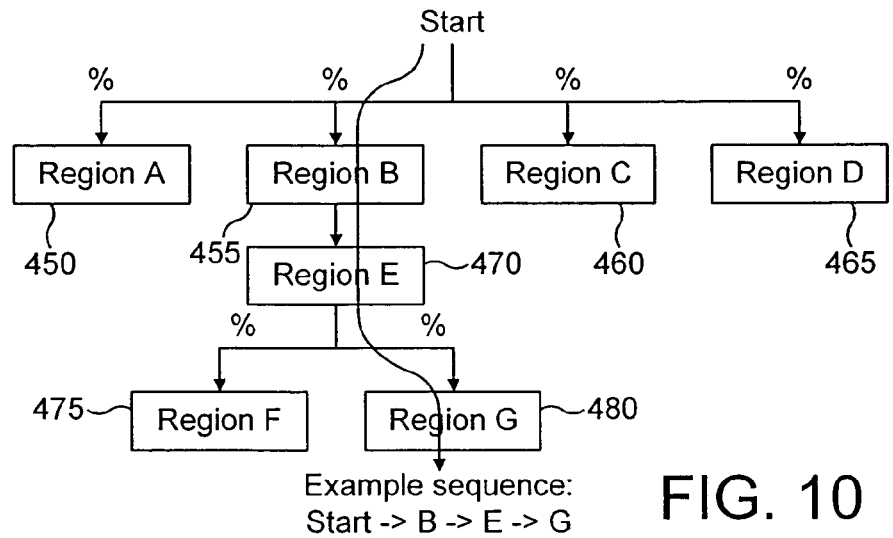
FIG. 10 illustrates a format of the configuration file in accordance with one embodiment of the present invention, where a tree structure is adopted.

To alleviate the above limitations, in preferred embodiments a configuration file is able to specify the regions in a tree structure, such as that illustrated in FIG. 10. This arrangement will also be referred to herein as a "Tree of Regions" (TOR). A TOR enables the regions to be defined in a plurality of levels, with each level containing one or more regions in one or more logical groups. Hence, as can be seen from FIG. 10, a first level may contain four regions, 450, 455, 460 and 465, a second level may contain a single region 470 and a third level may contain two regions 475 and 480. Certain regions can be specified as parent regions having one or more child regions depending therefrom. Hence, for example the region B 455 is a parent region having a corresponding child region E 470. In turn, region E 470 is a parent region having child regions F 475 and G 480 depending therefrom. If for the generation of a particular test sequence, a particular parent region's constraint attributes are used, a tree pointer is then updated to identify a lower level of the tree containing the child region(s) for that parent region, thereby ensuring that when the next test sequence is required, the configuration file is referenced beginning from that level containing the one or more child regions. This TOR approach allows sequences of regions to be defined. Each region within the tree has a defined weighting. This allows one to specify both the sequences of transfers and the distribution of these sequences over time. Hence, referring to FIG. 10, each of the regions A 450, B 455, C 460, D 465 will have a specified weighting identifying the percentage of time that the corresponding region will be selected. Once region B 455 is selected for a particular test sequence, then the following time a test sequence is required, only region E 470 can be selected. Similarly, after region E 470 has been selected, then the next time a test sequence is required, either regions F 475 or G 480 will be selected based on their respective weightings. Thereafter, the tree pointer will return to the first level, where once again the regions A 450, B 455, C 460, D 465 are selectable based on their weightings.

Hence, to replicate the behaviour illustrated by the LCD controller example of FIG. 9A, the regions shown in FIG. 10 could be defined such that region B 455 creates a long sequence of idle transfers, region E 470 creates an Incr 8 or Incr 16 burst, and regions F 475 and G 480 each create long sequences of idle transfers, perhaps of two different lengths. It should be noted that regions can contain a reference to a duration greater than a single transfer on the target bus.

Figure 11:
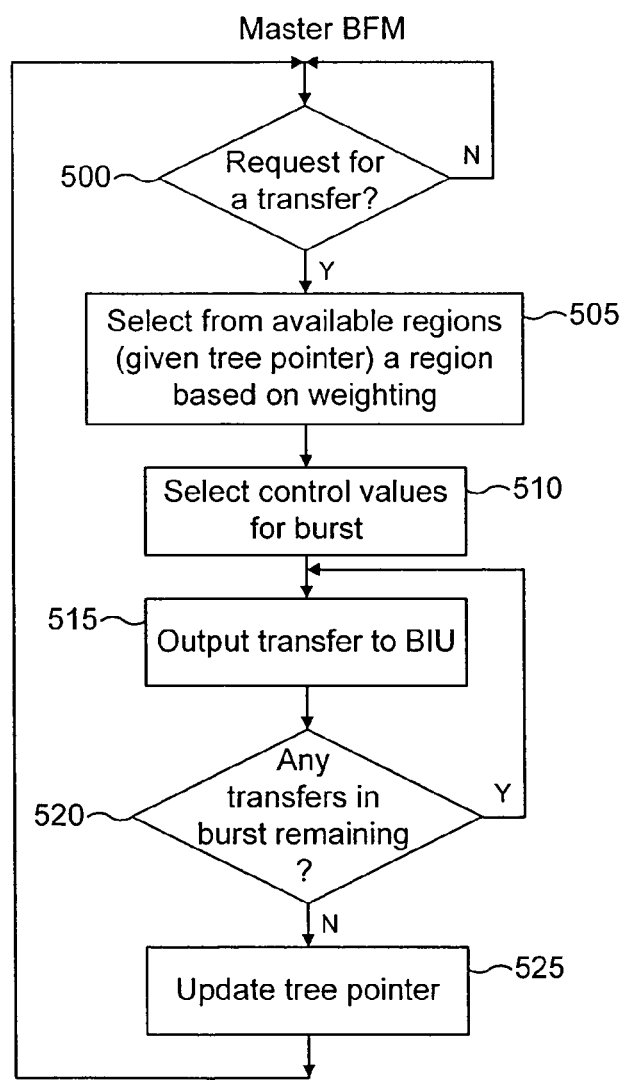
FIG. 11 is a flow diagram illustrating the operation of a master BFM in accordance with one embodiment of the present invention.

FIG. 11 is a flow diagram illustrating the operation of the master BFM 120 in accordance with one embodiment of the present invention. At step 500, a request for a transfer is awaited, whereafter the process proceeds to step 505 where a region is selected from the available regions based on the weighting. In the embodiment described in FIG. 11, it is envisaged that the regions used by the master BFM will not specify any requirement attributes, and hence the available regions will be dictated solely by the level of the tree structure specified by the tree pointer. If a flat structure is used instead of a tree structure, then it will be appreciated that all regions will be available for selection. Whilst the weighting is taken into account from a statistical point of view when selecting a particular region, the actual selection performed at step 505 is random.

Once a region has been selected, the process proceeds to step 510, where the control values for the burst are selected having regard to the values specified by the constraint attributes. For the purpose of describing FIG. 11, it will be appreciated that a single transfer, i.e. a non-burst transfer, can be considered to be the special case of a burst transfer specifying just a single transfer in a burst.

When the control values have been set, the process proceeds to step 515, where the transfer is then output to the BIU 150 from the transfer generator 140 (see FIG. 3). Thereafter, at step 520, it is determined whether any further transfers in the burst are remaining, and if so the process returns to step 515 to cause the next transfer to be output. However, if no further transfers in the burst are remaining, the process proceeds to step 525, where the tree pointer is updated as required. Hence, considering the example of FIG. 10, if the constraint attributes of region B 455 were used to generate the transfer, then the tree pointer will be updated to refer to the second level containing the region E 470. Thereafter, the process returns to step 500 to await a request for a further transfer.

Figure 12:
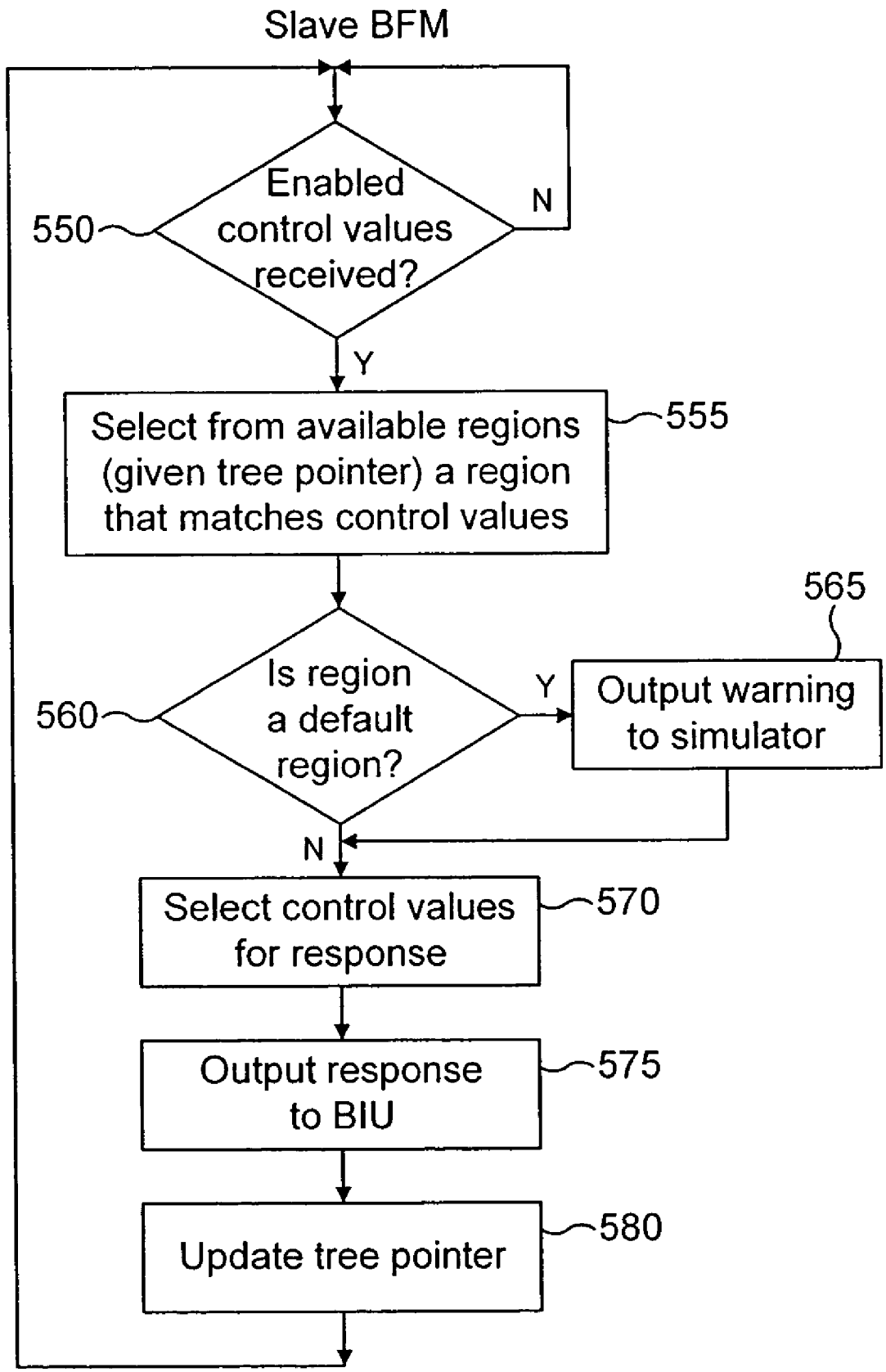
FIG. 12 is a flow diagram illustrating the operation of a slave BFM in accordance with one embodiment of the present invention.

FIG. 12 is a flow diagram illustrating the operation of the slave BFM 160 of FIG. 4. At step 550, the receipt of enabled control values is awaited by the response generator 170. Once received, the process proceeds to step 555, where a region that matches the control values is selected from the available regions, having regard to the tree pointer. As mentioned earlier with reference to FIGS. 7 and 8, the configuration file for the slave BFM will typically have associated with the regions pattern match data identifying predetermined requirements which must be met in order for those regions to be selectable, and hence will typically identify any required control values that need to be present for that region to be selectable. If none of the regions specifying particular pattern match data have pattern match data which matches the control values received, then preferably a default region is selected at step 555.

At step 560, it is determined whether the region selected was in fact such a default region, and if so, a warning is output to the simulator at step 565. The process then proceeds to step 570, or proceeds directly to step 570 from step 560 if the region selected was not a default region. At step 570, the control values for the response are selected having regard to the constraint attributes of the selected region. Thereafter, the response is output to the BIU 190 at step 575, after which the tree pointer is updated (if required) at step 580. Thereafter, the process returns to step 550 to await receipt of a further set of enabled control values.

The above description has concentrated on examples where the BFM test component is used to represent a master or a slave device. However, in an alternative embodiment, the BFM test component can be used to represent a bus interconnect test component. Such a component might have a fixed structure within each individual test environment, but any decision making function within the bus interconnect can be controlled by a region-based scheme such as that described earlier, and hence for example the address decode function or the bus arbitration function of such an interconnect test component can be managed using such a region-based scheme.

Considering the example of bus arbitration, it will appreciated that the configuration of arbitration is different to that for slaves and masters, as an arbiter is presented with simultaneous streams of information (i.e. bus requests) from which it must choose one before choosing the action/constraints to be applied. In contrast the ports of masters and slaves typically consider one stream at a time (for example "next transfer" for a master port, "next incoming request" for a slave port, etc). To support the parallelism of the arbiter, the configuration file of an embodiment of the present invention used when the BFM is to represent an interconnect test component incorporates not only requirement attributes and constraint attributes as discussed earlier with reference to the master and slave examples, but also decision attributes. As discussed earlier, the requirements specified by the requirement attributes are those conditions which must exist before a particular region in the configuration file can be selected. The constraint attributes then specify what action the test component is to take in response to the stimulus from the system. Considering the example of an arbiter, these constraint attributes hence specify which master unit to grant, and until when that grant should be maintained.

As regards decision attributes, these may define decisions which, if the associated region is selected, need to be made in order to determine what further path to take through the regions of the configuration file. As an example, considering the arbiter example, a decision may be associated with a set of requirements, and may allow a selection between one or more further sets of requirements, between one or more sets of constraint attributes, or between a mixture of further sets of requirement attributes and/or further sets of constraint attributes. It should be noted that in the earlier described master and slave examples, the concept of decisions is implicit, since having met a set of requirements, then there is only one decision (regarding progress through the regions of the configuration file) which can be made.

FIGS. 13A to 15B are diagrams schematically illustrating the behaviour implied by example configuration files that may be used when the BFM is to represent an interconnect test component. The truncated diamond icons in the diagrams represent combined "weightings", "requirements" and "decisions", whilst the boxes represent "constraints". In these diagrams, the term "W" indicates the relative weighting to be applied to a region, and has a value from 0 to 1, whilst the term "Req" specifies the requirements for entering a region, based on which masters are requesting access to the bus. Examples include "M1–2", which indicates either master 1 or master 2, or both, "noM", which indicates that no master is requesting, "any" which indicates any combination of requesting masters (including none), etc.

The term "Dec" indicates a decision to be taken to determine a choice of constraint attributes for that region or selection of a further region. Examples include "M1", which indicates "is master 1 requesting?" (irrespective of other masters), "Y" which indicates "always assume an answer of yes", etc.

The term "Grant" represents a constraint attribute identifying which master is to be granted. Examples include "M3" which indicates that master 3 should be granted, "reqM", which indicates that the highest (based on a predefined priority) requesting master should be granted (or a default master if none is requesting), etc. The term "Action" is a constraint attribute identifying how long the grant will last for. Examples include "grant 1 cycle", which indicates that the chosen master will be held granted for only one cycle before the next region is entered, "break on quad-word" which indicates that the grant will be held until a quad-word boundary is accessed (i.e. the lower address bits equal 0×10), etc.

Figure 13A:
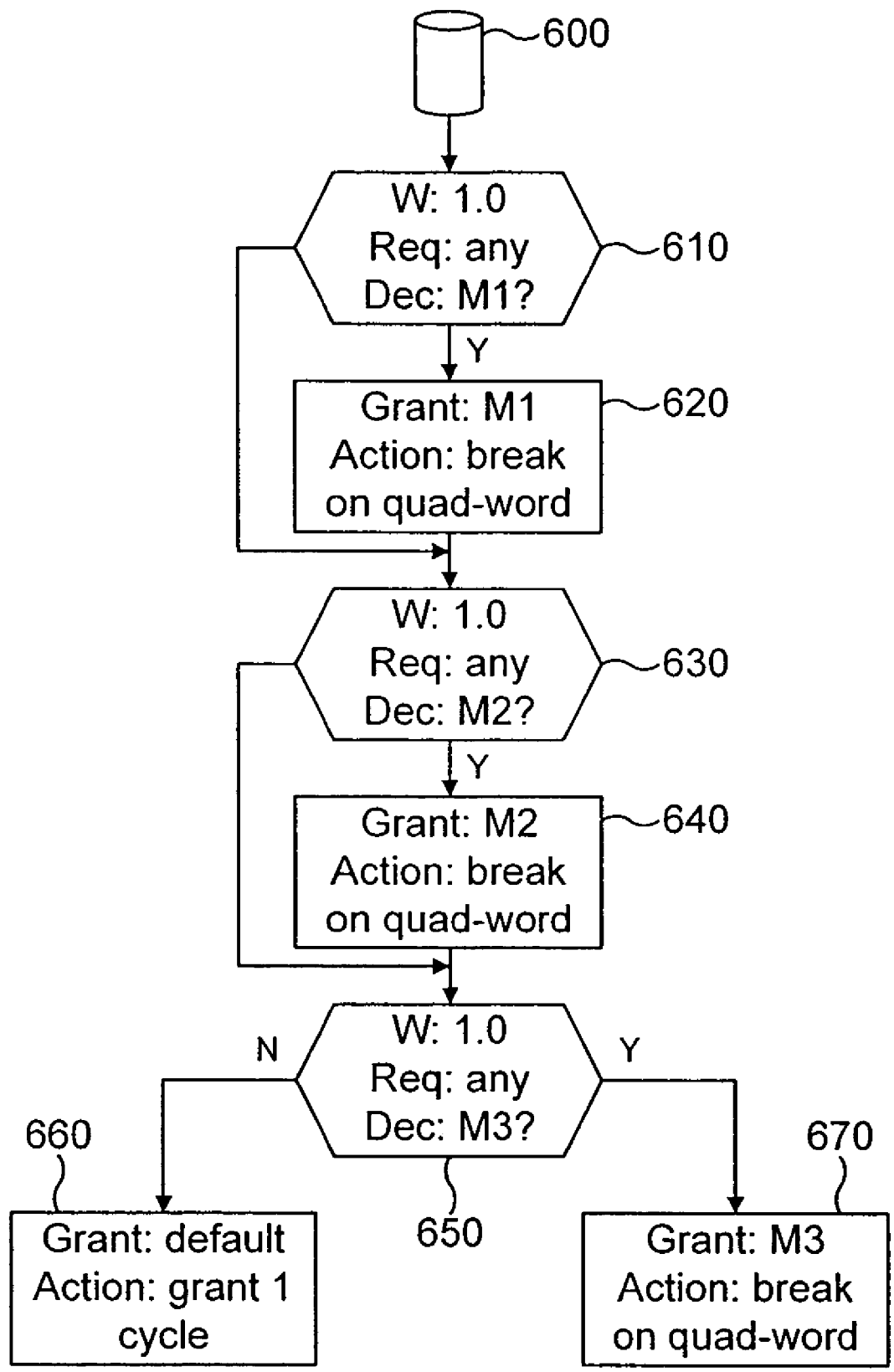
FIGS. 13A, 13B, 14, 15A and 15B illustrate schematically the behaviour implied by example configuration files that may be used for a bus interconnect test component in accordance with embodiments of the present invention.

FIG. 13A illustrates the format of a configuration file 600 used to mimic a round-robin arbitration scheme. As can be seen from FIG. 13A, the weighting, requirement and decision attributes 610, 630 and 650 of first, second and third regions each have a weighting of 1 and in effect do not specify any requirements (by virtue of "Reg" being set to "any"). Hence, on a first iteration, the decision attributes 610 will be referenced, and if master 1 is requesting, then the constraint attributes 620 of that region will be used, whereas otherwise the process will branch to the region having the decision attributes 630. The decision attributes 630 of the second region are then reviewed, and if master 2 is requesting, then the constraint attributes 640 of that region will be used for the test sequence, whereas otherwise the decision attributes 650 will be referenced. When the decision attributes 650 are referenced, then if master 3 is requesting access to the bus, the constraint attributes 670 of that region will be used, whereas otherwise the constraint attributes 660 of that region will be used.

From a review of FIG. 13A, it will be seen that on any particular reference to the configuration file, some constraint attributes will be selected which are used in defining the response made by the interconnect test component. If master 1 was requesting, and accordingly the constraint attributes 620 were used, the tree pointer is updated such that the next time the configuration file is referenced, the second region containing the weighting, requirement and decision attributes 630 will be referenced first. Similarly, if on any particular review of the configuration file, the constraint attributes 640 of the second region are used, then the tree pointer will be updated such that the next time the configuration file is referenced, the weighting, requirement and decision attributes 650 of the third region will be referenced first. This ensures a round-robin approach to granting of access to the bus to the various master devices.

Figure 13B:
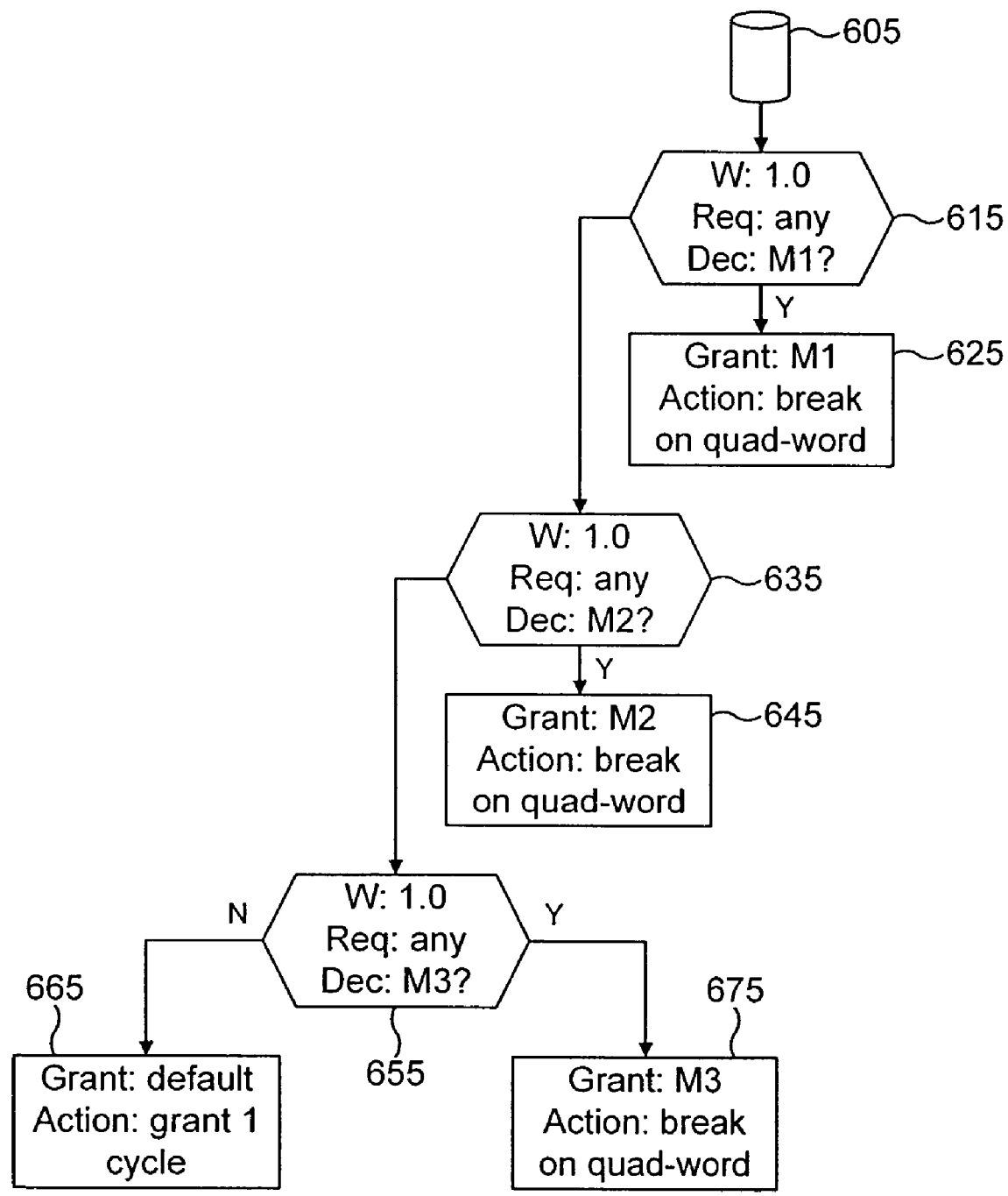

FIG. 13B shows an alternative form of configuration file 605 which is very similar to the configuration file 600 of FIG. 13A, but in which a fixed priority scheme is adopted rather than a round-robin approach. Hence, even if on a particular reference to the configuration file, the constraint attribute 625 are used in order to grant access to master 1, then the next time the configuration file 605 is referenced, it will again be referenced beginning with the weighting, requirement and decision attributes 615 of the first region.

Figure 14:
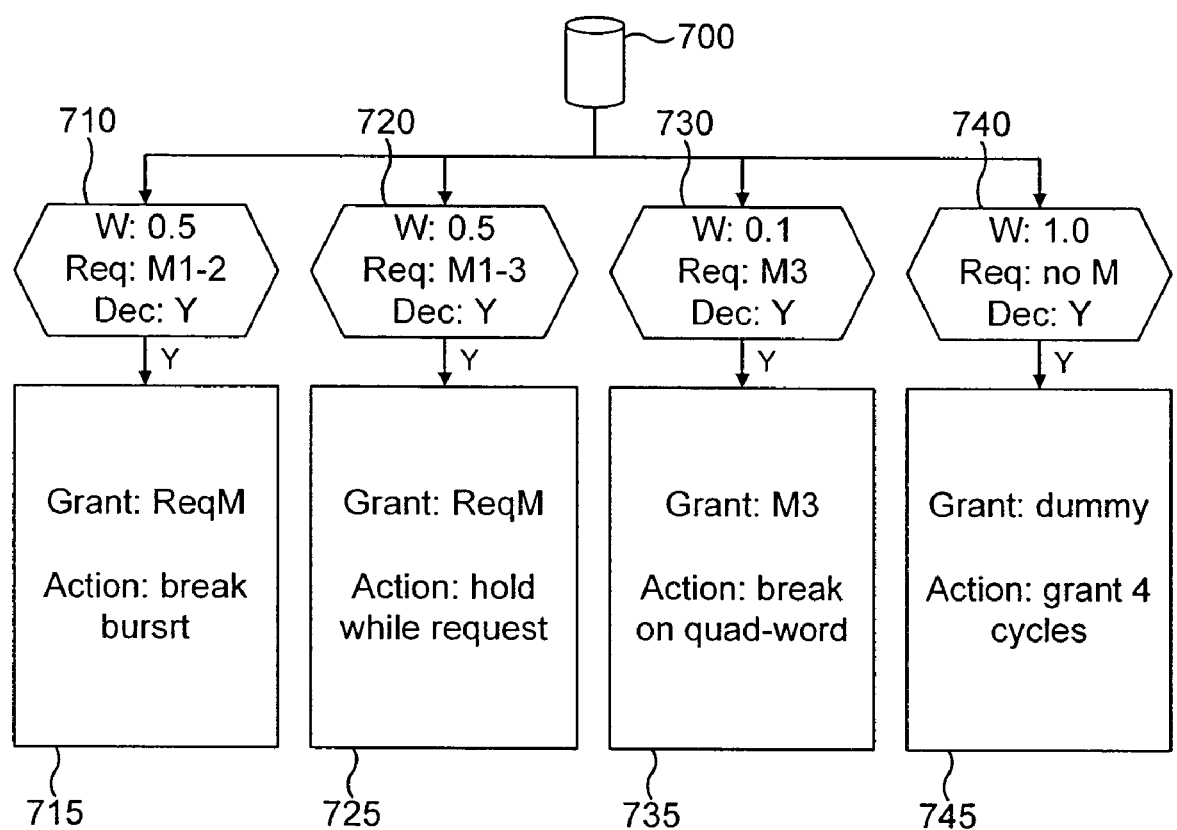

FIG. 14 illustrates an alternative arrangement of configuration file 700, in which a random arbitration is performed based on the weighting values of the various regions. Accordingly, a first region has the weighting, requirement and decision attributes 710 and corresponding constraint attributes 715, the second region has weighting, requirement and decision attributes 720 and corresponding constraint attributes 725, etc. In this example, it can be seen that the decision attributes in each region are set to "Y", this identifying that only one decision can effectively be made, namely to choose the constraint attributes of the associated region. If no master is issuing a request, then the fourth region 740 is selected, which has constraint attributes 745 indicating that a dummy master should be granted access to the bus for four cycles. With reference to the constraint attributes 715, the term "break burst" specifies that the indicated master should be granted access to the bus, but that that access should then be de-granted at some point during the burst transfer from that master, rather than allowing the burst to complete. With reference to the constraint attributes 725, the term "hold while request" specifies that the indicated master should be granted access to the bus, and that the access should remain granted whilst the master continues to request access to the bus.

Figure 15A:
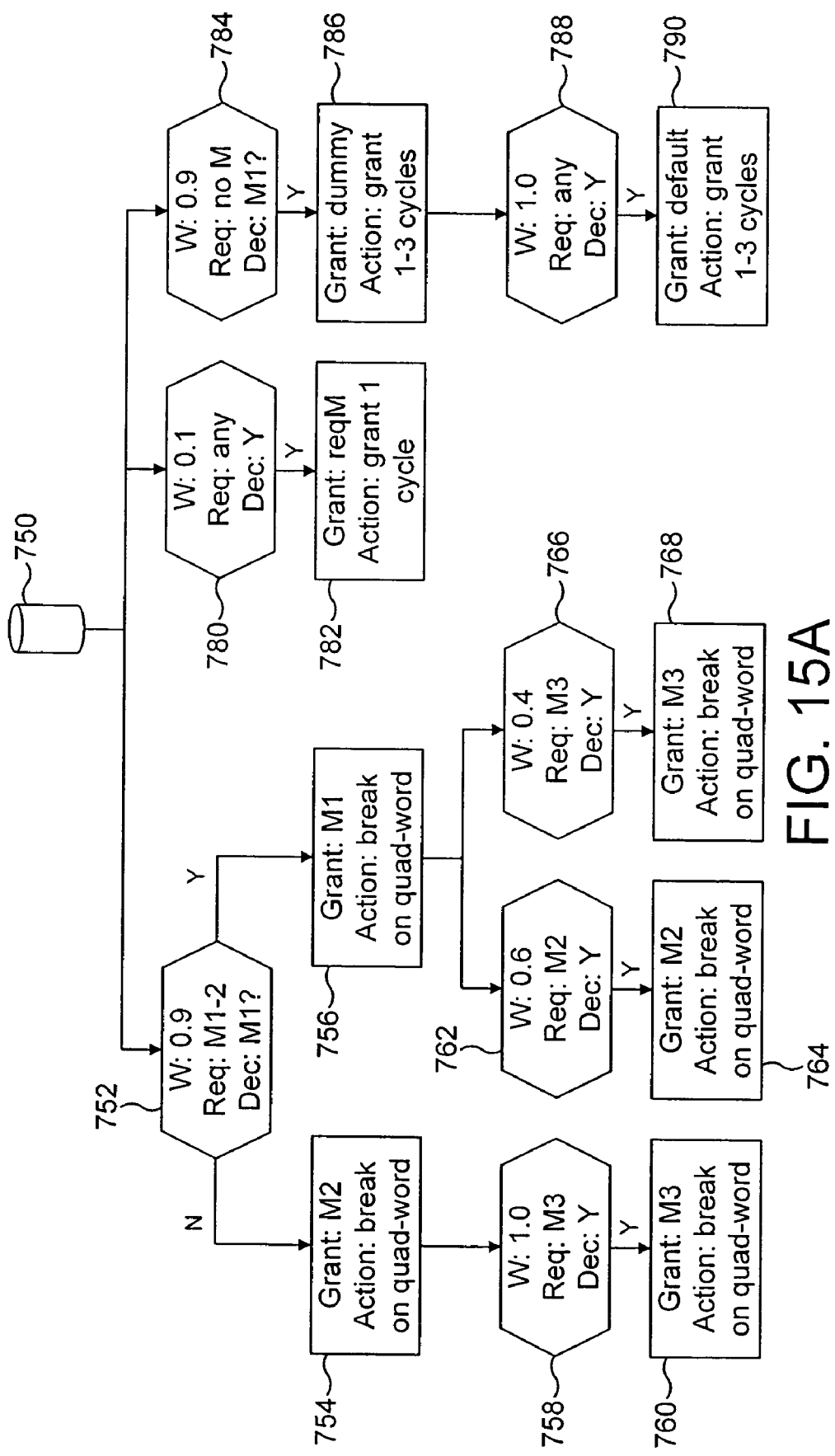
Figure 15B:
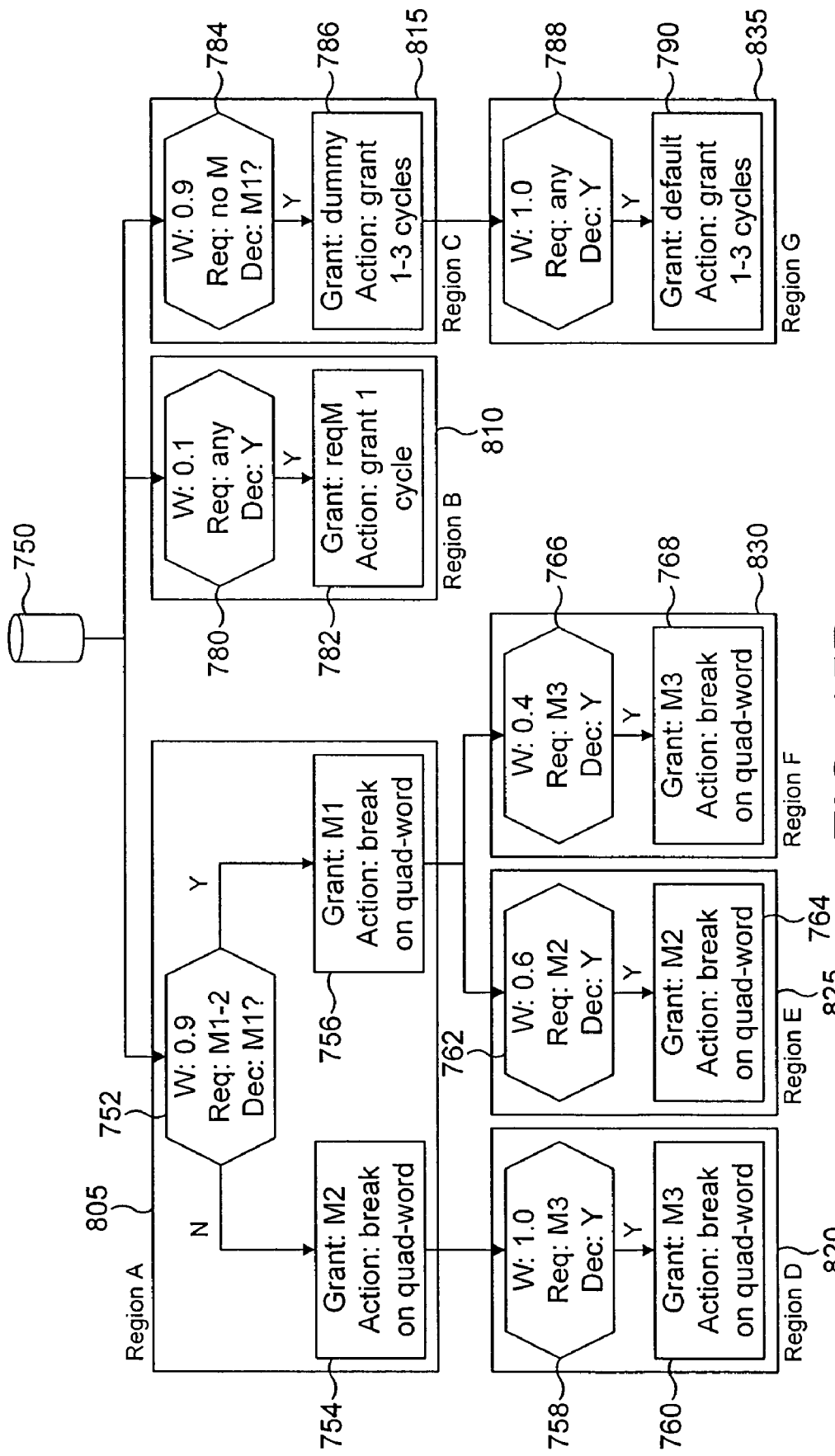

FIG. 15A illustrates an example of a TOR format of configuration file 750 which may be used to manage the arbitration scheme in the event that the BFM is an interconnect test component. FIG. 15B is the same diagram, but identifies the various regions provided within the configuration file. When the configuration file 750 is first accessed, the regions 805, 810 and 815 are referenced. The requirement attributes 752 and 784 of regions 805 and 815 are mutually exclusive, since region 805 will only be selectable if either master 1 or master 2 (or both) are requesting access to the bus, whilst region 815 will only be selectable if no masters are requesting access to the bus. Meanwhile, region B 810 will be selectable irrespective of which masters are requesting access to the bus, and even if no masters are requesting access to the bus. Hence, the weighting values of regions A 805 and B 810 are arranged to add up to 1 and similarly the weighting values of regions B 810 and C 815 are arranged to add up to 1.

If region A 805 is selected, then if master 1 is requesting access to the bus, the constraint attributes 756 are used, whereas otherwise the constraint attributes 754 are used. Then the tree pointer is updated to point to a second level of the tree containing regions D 820, E 825, F 830 and G 835. If the constraint attributes 754 were used, then only region D 820 is selectable the next time the configuration file 750 is referenced and accordingly this region will have a weighting of 1. If the constraint attributes 756 were used, then both regions E 825 and F 830 are selectable, and their combined weightings add up to 1.

It will be noted that at some point in the tree, for example when selecting regions D 820, E 825 or F 830 having left region A 805, the available regions do not cover all possible input permutations. In this case, there will typically be provided a fall-back action, for example a separate set of constraints which is used in such cases. If that separate set of constraints is used as a fall-back action, it is envisaged that the TOR pointer will not be updated. Alternatively, instead of such a fall-back action, the TOR pointer could be arranged to jump back to the start of the tree in the event that an input permutation exists which is not covered by the available region, and in that event a requirement is placed on the designer of the tree to ensure that the start of the tree always covers all possible input permutations.

Figure 16:
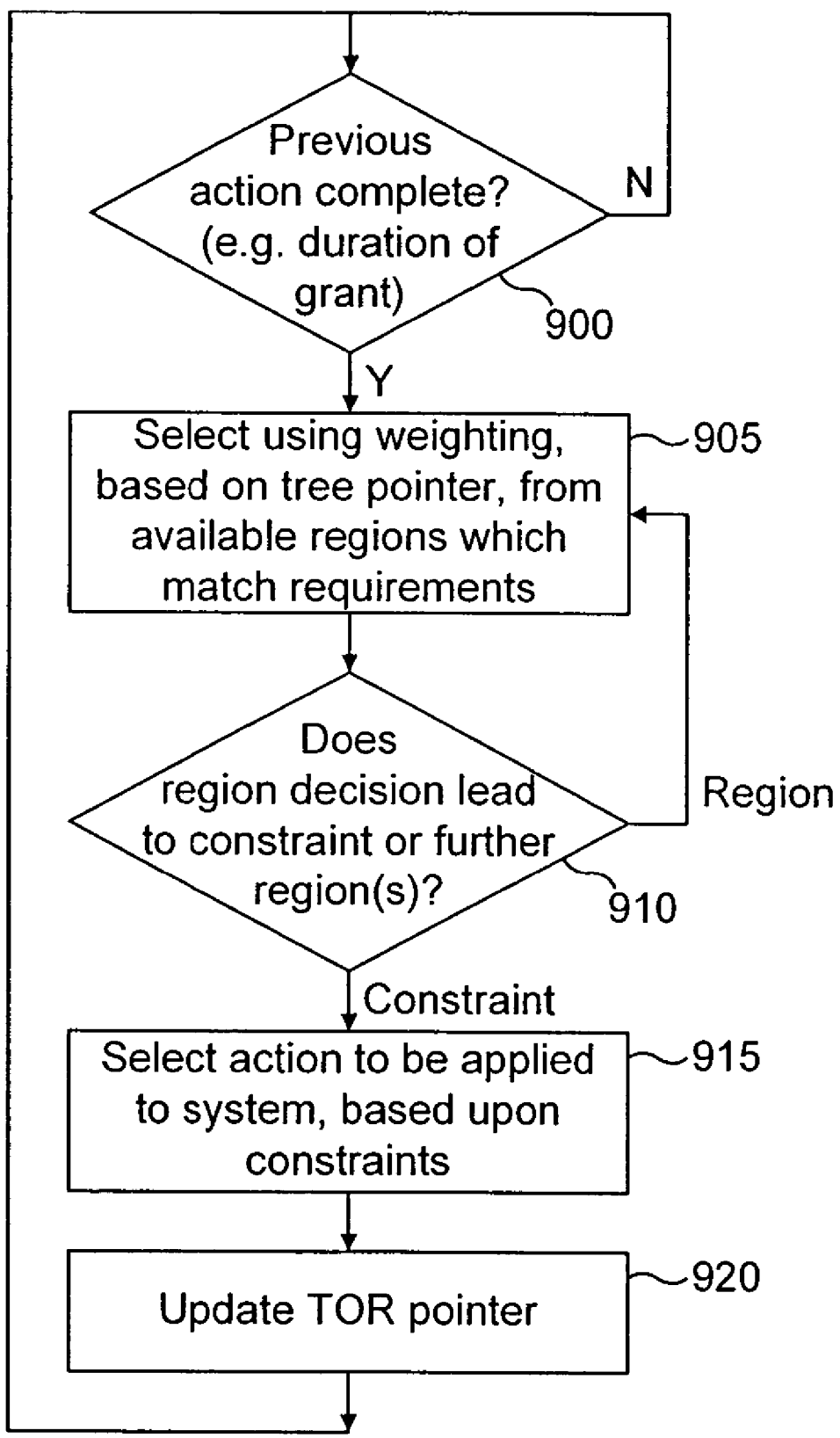
FIG. 16 is a flow diagram illustrating the operation of a bus interconnect test component in accordance with one embodiment of the present invention.

FIG. 16 is a flow diagram illustrating the operation of the BFM in the event that it is used as an interconnect test component. At step 900, completion of the previous action is awaited, and accordingly the end of the grant to the previous master is awaited. Thereafter, the process proceeds to step 905 where a region is selected from the available regions having regard to the tree pointer. From the available regions, a particular region is selected having regard to any requirement attributes, and having regard to the weighting in the event that multiple regions have matching requirement attributes.

Then, at step 910, it is determined whether the decision attributes within that selected region lead to the selection of constraint attributes, or to the selection of a further region. In the event that the decision attributes lead to the selection of constraint attributes for that region, then the process proceeds to step 915, whereby the action to be applied to the system is selected based on the constraint attributes, whereafter the TOR pointer is updated at step 920 as required prior to the process returning to step 900.

If, however, at step 910, it is determined that the decision attributes lead to a further region, then the process returns to step 905 to cause a further region to be selected based on the tree pointer, any requirement attributes, and the weighting values.

It will be appreciated that in the above examples the regions are illustrated as comprising both a requirement/decision component plus the constraint attributes resulting from the decision. However, it will be appreciated that it is not a requirement that each region in fact includes constraint attributes. For example it would be possible to create a complex decision which would be represented by cascaded requirement/decision component, with only the last requirement/decision component in the cascade having constraint attributes associated therewith.

FIGS. 17A to 17E illustrate various example test environments where at least one BFM in accordance with embodiments of the present invention is used as a test component to issue a test sequence to a DUT. Considering first FIG. 17A, it can be seen that the DUT 1000 consists of an interconnect block component 1010 and three slave components 1020, 1030 and 1040. These components may for example be written in RTL. In the example illustrated in FIG. 17A, the third slave 1040 also has access to an external model 1050. The test stimulus used to test the operation of the DUT 1000 is generated by three master BFMs 1060, 1070 and 1080, each having associated therewith a configuration file 1065, 1075, 1085, respectively. With the arrangement illustrated in FIG. 17A, the test is performed with the actual slave responses generated by the real slave components, whilst the master BFMs are used to mimic the actual master components that are intended to be placed within the final system. The benefit of such an approach is that the stimulus files required to perform the tests are very small compared with typical prior art techniques. Furthermore, it is possible to saturate the interconnect block 1010 within the capabilities of the slave devices, 1020, 1030, 1040. This allows exploration of the interconnect block configuration for the required masters and slaves.

Figure 17A:
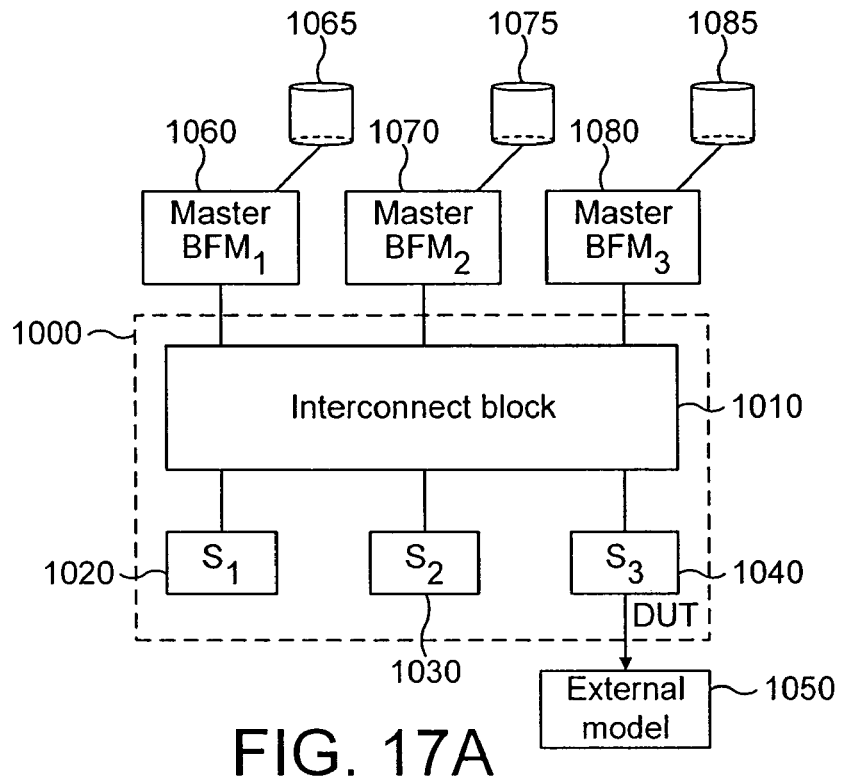
FIGS. 17A to 17E illustrate various test environments that can be produced when employing test components in accordance with embodiments of the present invention.
Figure 17B:
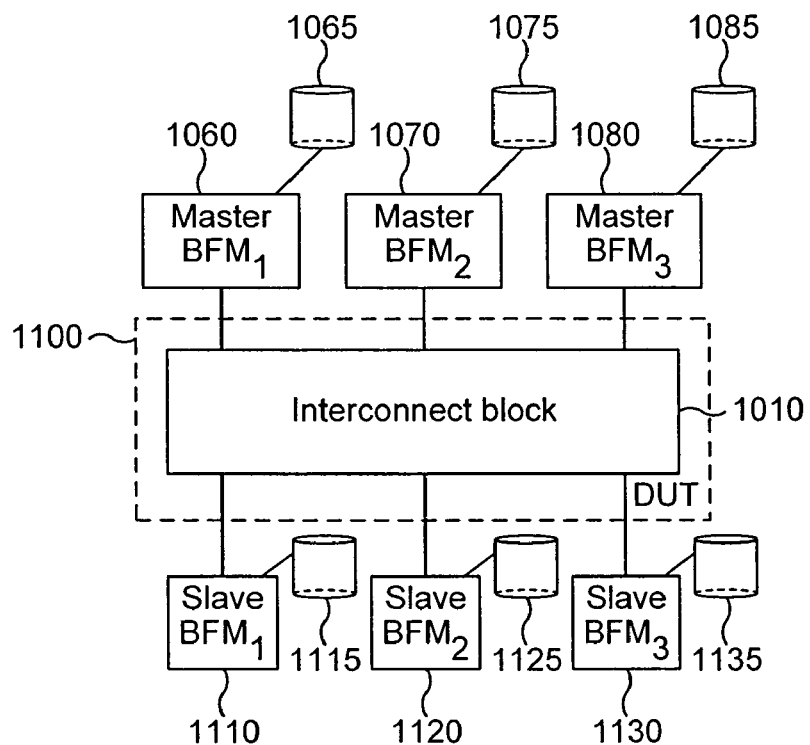

FIG. 17B illustrates an alternative configuration in which only the interconnect block component 1010 is provided within the DUT 1100. Again, this interconnect block component 1010 may for example be written in RTL. In this instance, not only are the masters represented by the master BFMs used in FIG. 17A, but in addition the slave components are represented by slave BFMs 1110, 1120, 1130, along with their associated configuration files 1115, 1125, 1135, respectively. With such an approach, it is possible to focus on certain behaviour of the interconnect block 1010 that it is particularly desired to test. Further, such an approach allows design exploration without the need for complete master or slave models in RTL. Again, the master BFMs are used to mimic the actual master devices that are intended to be used in the final system, and in addition the slave BFMs are used to mimic the actual slave devices that are intended to be placed within the final system. As with FIG. 17A, the stimulus files required to perform the tests are small compared to typical prior art approaches. Given that both the masters and the slaves are represented by BFMs, it is now possible to saturate the interconnect block 1010 to test compliance with the full bus specification.

Figure 17C:
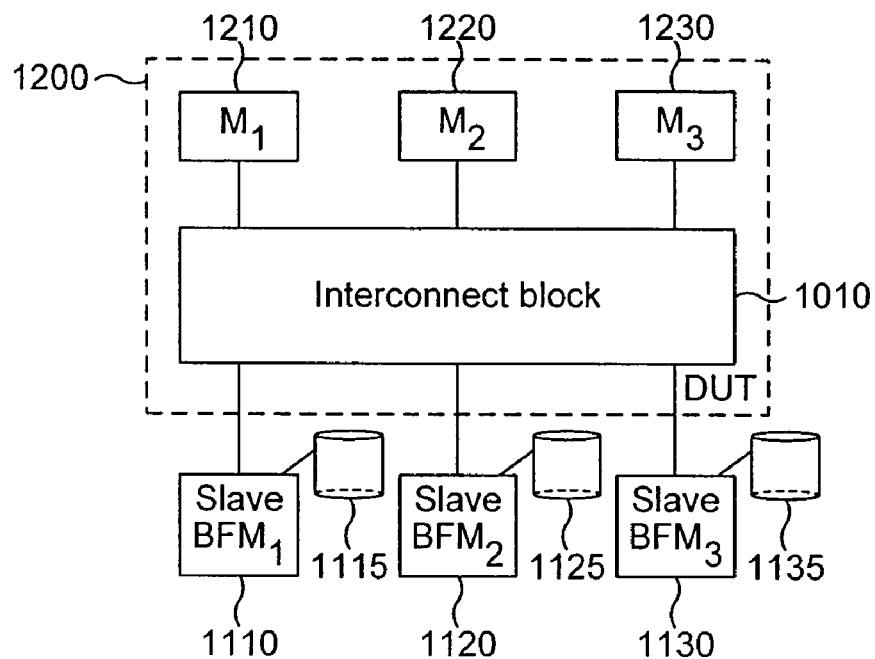

FIG. 17C represents an example in which the DUT 1200 consists of the interconnect block component 1010, and the actual master components 1210, 1220, 1230. Again, both the interconnect block component and the master components may be written in RTL. The three slave devices are represented by the slave BFMs 1110, 1120, 1130 along with their associated configuration files 1115, 1125, 1135, respectively. With such an approach, the system can be tested with the actual transfer requests issued by the master devices, with the BFMs being used to mimic the actual slave responses. Again, small stimulus files are required, and it is possible to saturate the interconnect block within the capabilities of the masters. This hence allows exploration of the interconnect configuration for the required masters and slaves.

Figure 17D:
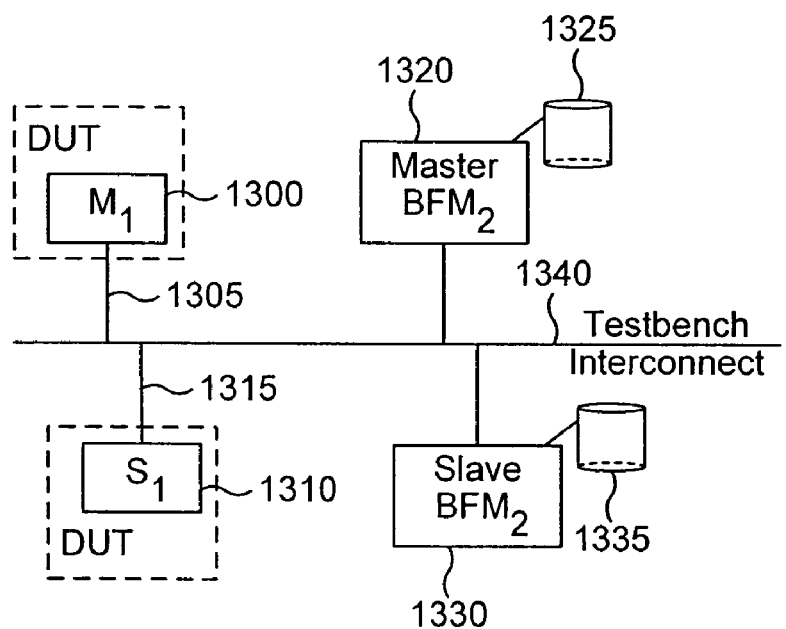

FIG. 17D illustrates an alternative configuration which can be used to test an individual master device 1300 or an individual slave device 1310. As with the previous examples both the master device 1300 and the slave device 1310 may be written in RTL. The testbench interconnect 1340 may then be provided at an abstract level, in the same way as the master BFM 1320 and the slave BFM 1330, each having their respective configuration files 1325, 1335, respectively. A full bus interface 1305, 1315 will be provided to the master DUT 1300 or slave DUT 1310, in order to enable full testing of each DUT.

Figure 17E:
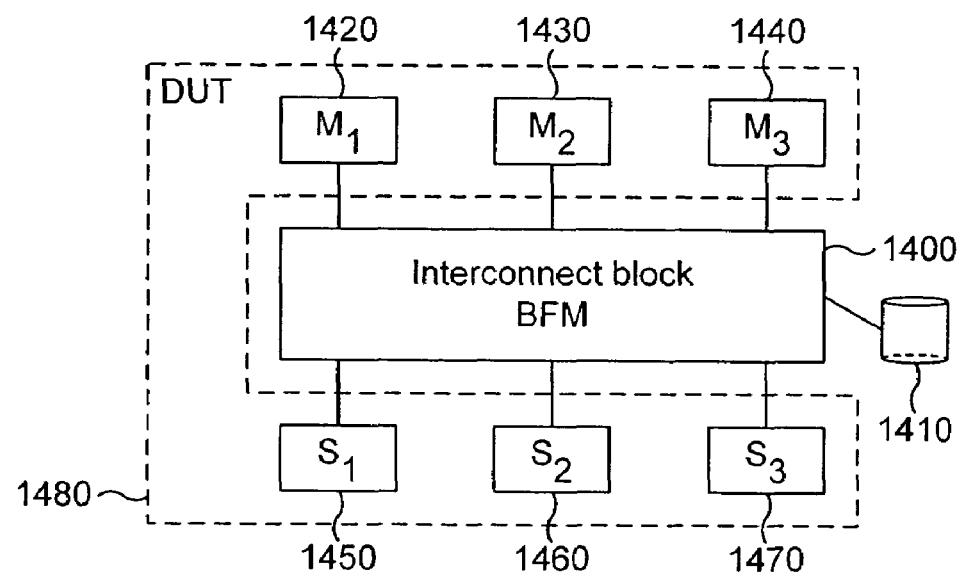

FIG. 17E is an alternative embodiment in which the test component used to generate test sequences for the DUT is an interconnect block BFM 1400, with its associated configuration file 1410. In this instance, the DUT consists of three master devices 1420, 1430 and 1440 and three slave devices 1450, 1460 and 1470. Again, as with the other examples, the components within the DUTs 1480 may be written in RTL. This enables the system to be tested with the actual transfer requests issued by the real masters and the actual slave responses provided by the real slaves, with the BFM being used to mimic functions of the interconnect block 1400, such as arbitration. It hence allows design exploration without the need for the complete interconnect block model in RTL. Further, this approach allows different interconnect configurations to be trialled.

In accordance with one embodiment of the present invention, it is possible to implement some feedback from the observed results of the test procedures into subsequent random generation, this methodology being referred to hereafter as "reactive testing". Hence, the techniques of embodiments of the present invention allow any coverage holes identified when performing tests to then be addressed by writing new configurations (and if required new regions) to cover these holes. The means for identifying the coverage holes may be manual, but could alternatively be automated depending on the complexity.

In particular, reactive testing can optionally be automated in a number of circumstances. For example, when using a TOR arrangement for the configuration file, the test can be recursively executed with each possible sequence being covered. This may be achieved by dynamically altering the TOR to remove sequences that have either been executed once, or have been executed a target number of times from previous iterations. As discussed previously, this can effectively be achieved by altering the weightings of particular regions.

As another example, when considering a bus matrix interconnect block, a selection of regions are defined to cover the address range of each target slave. Once selected, a given slave contributes to the system coverage such that at the end of a test run the slaves that have been accessed are known. Coverage goals can be set for each slave such that a slave must be accessed at least n times, where n can be greater than or equal to 0, and optionally a selection of burst types or transaction behaviour must be observed. At the end of a test run, if this coverage criteria has not been met, then the test may automatically be restarted giving greater weighting to the regions that specify the new target slaves. For slaves with coverage criteria that have been met, the weighting of regions designed to access those slaves can be reduced to less than "m", where m is the region weighting of a slave that has had its coverage criteria met.

As another example, for design exploration purposes, it would be possible to alter the weightings on the region lists by conforming to a constrained random weighting. This would give a controlled variance on which regions had priority. Tests would be re-run automatically until the minimum, median, and maximum variance were observed for each region. In a similar fashion, variance constraints can also be applied to the transfer types that regions can generate. This may be in the form of a valid list of transfer types per region with associated weightings. Coverage would be collected based on the selection of transfer types observed, and the test automatically re-run with new region constraints covering transfer types not observed from the selection list. The benefits of this approach would be to automatically generate batch regression runs with the target of stressing the system design with the minimum requirement for user intervention. The ability to measure the completeness of testing in certain areas is also a contributing factor to the confidence in the design under test.

Given the above discussion of embodiments of the present invention, it will be appreciated that embodiments of the present invention may be used in a variety of manners. For example, they may be used to replicate multi-port bus master configurations, by creating multiple instances of master BFMs and configuring each one appropriately. Further, embodiments of the present invention can be used to soak test a block/subsystem for an arbitrary length of time from a single configuration, that is without requiring one to create additional test sequences. Further, the techniques of embodiments of the present invention can be used to validate a multi-layer bus matrix topology by appropriately configuring each BFM to emulate a master in a system, then randomly generating test sequences, collecting bus statistics, and then analysing the results to see if the bus matrix can be further optimised, by either increasing the number of layers (if the buses are approaching full utilisation), or decreasing the number of layers (if the utilisation is low, or not correlated on certain ports).

Figure 18:
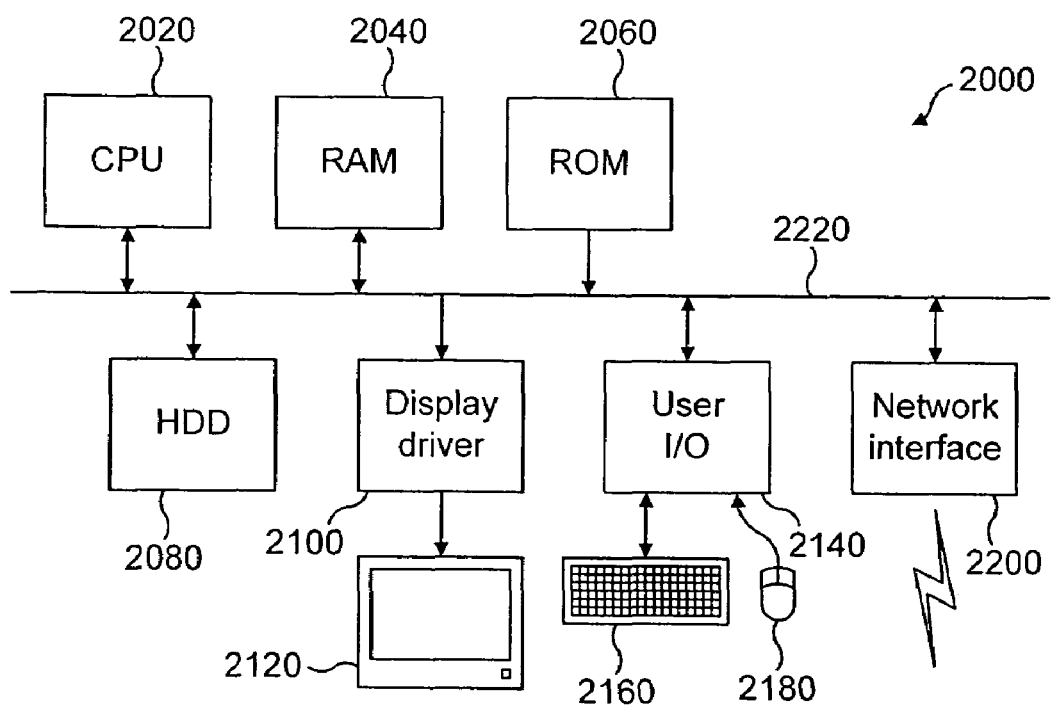
FIG. 18 is a block diagram of a computer system on which the testing procedures of embodiments of the present invention can be run.

FIG. 18 schematically illustrates a computer 2000 of a type that may be used to execute computer programs to perform the functions described above. The computer 2000 includes a central processing unit 2020, a random access memory 2040, a read-only memory 2060, a hard disk drive 2080, a display driver 21 user input/output circuit 2140, a keyboard 2160, a mouse 2180 and a network interface unit 2200, all coupled via a common bus 2220. In operation, the central processing unit 2020 executes computer programs using the random access memory 2040 as its working memory. The computer programs may be stored within the read-only memory 2060, the hard disk drive 2080, or retrieved via the network interface circuit 2200 from a remote source. The computer 2000 displays the results of its processing activity to the user via the display driver 2100 and the display 2120. The computer 2000 receives control inputs from the user via the user input/output circuit 2140, the keyboard 2160 and the mouse 2180.

The test component and its associated configuration file, and/or the simulator tool, may take the form of one or more computer programs stored within the computer system 2000 on the hard disk drive 2080, within the random access memory 2040, within the read-only memory 2060, or downloaded via the network interface circuit 2200. The computer program(s) may also be provided on a recording medium such as a compact disk or floppy disk drive that may be used for distribution purposes. When operating under the control of the above described computer program(s), the various components of the computer 2000 serve to provide the appropriate circuits and logic for carrying out the above described functions and acts. It will be appreciated that the computer 2000 illustrated in FIG. 18 is merely one example of a type of computer that may execute the computer program(s) and the methods described above.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A method of operating a test component in a test environment to issue a test sequence over a bus to a device under test, a configuration file being provided to specify the behaviour of the test component, the configuration file comprising a plurality of regions with each region specifying attributes for use in determining the test sequence, and a number of said regions specifying constraint attributes defining allowable test sequences, the method comprising the steps of:
   a) when a test sequence is required to be issued, causing the test component to select, based on predetermined criteria, one of said number of regions provided by the configuration file; and
   b) using the constraint attributes for that selected region to generate the test sequence to be issued on to the bus.

2. A method as claimed in claim 1, wherein each region in said plurality specifies constraint attributes.

3. A method as claimed in claim 1, wherein the plurality of regions in the configuration file are organised in one or more logical groups, each logical group containing one or more of said regions, and wherein each region has a weighting value associated therewith, and said step (a) comprises the steps of:
   selecting a said logical group; and
   using as the predetermined criteria at least the weighting values of regions within the selected logical group.

4. A method as claimed in claim 3, wherein the attributes of one or more of said plurality of regions comprise requirement attributes defining requirements which must be met to enable selection of those regions, and said step (a) further comprises the step of:
   using as the predetermined criteria requirement attributes in any of the regions within the selected logical group in order to determine whether the requirements specified by those requirement attributes are met.

5. A method as claimed in claim 4, wherein the test component is a slave test component operable to issue as the test sequence a response to a transfer request, and the constraint attributes define allowable responses for the corresponding region, and wherein the requirement attributes comprise pattern match data identifying allowable transfer requests that the associated region can issue a response to, and said step (a) includes a determination of which regions within the selected logical group have pattern match data corresponding to the transfer request to be responded to.

6. A method as claimed in claim 4, wherein the test component is a bus interconnect test component operable to issue as the test sequence a grant signal granting access to the bus to the device under test, and the constraint attributes define allowable grant signals for the corresponding region, and wherein the requirement attributes comprise an identification of allowable master logic units within the test environment that that region can issue the grant signal to.

7. A method as claimed in claim 6, wherein at least one of said regions within the selected logical group defines a plurality of possible further processing options available in order to determine the constraint attributes to be used at said step (b), and the requirement attributes of said at least one region have decision attributes associated therewith defining a decision to be made if that region is selected in order to choose between said plurality of possible further processing options.

8. A method as claimed in claim 7, wherein said decision attributes identify the further processing options to perform dependent on which master logic unit is requesting access to the bus.

9. A method as claimed in claim 3, wherein said step (a) comprises the step of making a random selection of a region within the selected logical group based on the predetermined criteria.

10. A method as claimed in claim 3, wherein at least one of said regions within the selected logical group defines a plurality of possible further processing options available in order to determine the constraint attributes to be used at said step (b), and the attributes of said at least one of said regions comprise decision attributes defining a decision to be made if that region is selected in order to choose between said plurality of possible further processing options.

11. A method as claimed in claim 10, wherein said decision attributes define criteria in which a further selection of regions within another logical group is required at said step (a) in order to select said one of said number of regions whose constraint attributes are to be used at said step (b).

12. A method as claimed in claim 10, wherein said at least one of said regions has one or more sets of constraint attributes, and the decision attributes define criteria in which one of said sets of constraint attributes should be used at said step (b).

13. A method as claimed in claim 3, wherein the configuration file comprises a single logical group, and each region in said plurality specifies constraint attributes.

14. A method as claimed in claim 1, wherein the plurality of regions in the configuration file are organised in a tree structure having a plurality of levels, each level containing one or more of said regions in one or more logical groups, such that at least one of the number of regions at a first level of the tree structure is a parent region having one or more child regions depending therefrom at a lower level of the tree structure, and the method comprises the further step of:

c) following generation of the test sequence, updating a tree pointer identifying a current level in the tree, such that if the test sequence was generated based on the constraint attributes of a said parent region, the tree pointer then points to a lower level of the tree containing the one or more child regions, thereby ensuring that when the next test sequence is required, said step (a) comprises beginning the selection step from said one or more child regions provided by the configuration file.

15. A method as claimed in claim 1, wherein the test component is a master test component operable to issue as the test sequence a transfer request, and the constraint attributes define allowable transfer requests for the corresponding region.

16. A method as claimed in claim 15, wherein the constraint attributes define an address range for allowable transfer requests and one or more allowable transfer types.

17. A method as claimed in claim 16, wherein the constraint attributes further define one or more allowable burst types.

18. A method as claimed in claim 17, wherein if the burst type used to generate the test sequence specifies multiple transfer requests, said step (b) comprises the step of generating as the test sequence each of the transfer requests specified by the burst type.

19. A method as claimed in claim 15, wherein each region specifies constraint attributes.

20. A method as claimed in claim 1, wherein the test component is a slave test component operable to issue as the test sequence a response to a transfer request, and the constraint attributes define allowable responses for the corresponding region.

21. A method as claimed in claim 20, wherein the constraint attributes define one or more allowable response types.

22. A method as claimed in claim 21, wherein the constraint attributes further define any allowable wait cycles.

23. A method as claimed in claim 21, wherein the constraint attributes further define allowable data for the response.

24. A method as claimed in claim 20, wherein each region specifies constraint attributes.

25. A method as claimed in claim 1, wherein the test component is a bus interconnect test component operable to issue as the test sequence signals to be generated by the bus interconnect itself, and the constraint attributes define allowable signal values for the corresponding region.

26. A method as claimed in claim 25, wherein the test sequence comprises one or more grant signals granting access to the bus to the device under test, and the constraint attributes define allowable grant signals for the corresponding region.

27. A method as claimed in claim 26, wherein the test environment includes a plurality of master logic units that can access the bus, at least one of said master logic units being the device under test, and said constraint attributes define to which master logic unit the grant signal is to be issued.

28. A method as claimed in claim 27, wherein the constraint attributes further define how long the granted master logic unit will be granted access to the bus.

29. A method as claimed in claim 25, wherein the test sequence comprises one or more slave select signals to the device under test, and the constraint attributes define allowable select signals for the corresponding region.

30. A method as claimed in claim 25, wherein the test sequence comprises one or more bus wait signals to the device under test, and the constraint attributes define allowable bus wait signals for the corresponding region.

31. A method as claimed in claim 25, wherein each region specifies constraint attributes.

32. A method as claimed in claim 1, further comprising the step of:

repeating said steps (a) and (b) a plurality of times to cause multiple test sequences to be issued over the bus to the device under test until a desired level of coverage has been obtained.

33. A method as claimed in claim 32, wherein the plurality of regions in the configuration file are organised in one or more logical groups, each logical group containing one or more of said regions, and wherein each region has a weighting value associated therewith, and said step (a) comprises the steps of:

selecting a said logical group; and
using as the predetermined criteria at least the weighting values of regions within the selected logical group;
the method further comprising the steps of:
monitoring the level of coverage obtained to identify a gap in coverage; and
upon identification of a gap in coverage, altering the weighting values associated with the regions to increase the likelihood of that gap being covered during a subsequent iteration of said steps (a) and (b).

34. A method as claimed in claim 33, wherein if the gap in coverage is a region that has not been used to generate a test sequence, then the step of altering the weighting values involves increasing the weighting value of that region relative to the weighting values of other regions.

35. A method as claimed in claim 33, wherein the test component is a master test component operable to issue as the test sequence a transfer request, and the constraint attributes define allowable transfer requests for the corresponding region, and if the gap in coverage relates to an access to a particular slave component, then the step of altering the weighting values involves increasing the weighting value of those region or regions that have constraint attributes defining an address range for that slave component.

36. A method as claimed in claim 1, wherein the device under test comprises at least a bus interconnect block.

37. A computer program product comprises test component code portions operable to control a computer to perform the method of claim 1.

38. A test component for use in a test environment to issue a test sequence over a bus to a device under test, the test component being operable to have access to a configuration file specifying the behaviour of the test component, the configuration file comprising a plurality of regions with each region specifying attributes for use in determining the test sequence, and a number of said regions specifying constraint attributes defining allowable test sequences, the test component comprising:

selection logic operable, when a test sequence is required to be issued, to select, based on predetermined criteria, one of said number of regions provided by the configuration file; and generation logic operable to use the constraint attributes for that selected region to generate the test sequence to be issued on to the bus.

39. A test component as claimed in claim 38, wherein each region in said plurality specifies constraint attributes.

40. A test component as claimed in claim 38, wherein the plurality of regions in the configuration file are organised in one or more logical groups, each logical group containing one or more of said regions, and wherein each region has a weighting value associated therewith, and said selection logic is operable to select a said logical group, and to use as the predetermined criteria at least the weighting values of regions within the selected logical group.

41. A test component as claimed in claim 40, wherein the attributes of one or more of said plurality of regions comprise requirement attributes defining requirements which must be met to enable selection of those regions, and said selection logic is operable to use as the predetermined criteria requirement attributes in any of the regions within the selected logical group in order to determine whether the requirements specified by those requirement attributes are met.

42. A test component as claimed in claim 41, wherein the test component is a slave test component operable to issue as the test sequence a response to a transfer request, and the constraint attributes define allowable responses for the corresponding region, and wherein the requirement attributes comprise pattern match data identifying allowable transfer requests that the associated region can issue a response to, and said selection logic is operable to determine which regions within the selected logical group have pattern match data corresponding to the transfer request to be responded to.

43. A test component as claimed in claim 41, wherein the test component is a bus interconnect test component operable to issue as the test sequence a grant signal granting access to the bus to the device under test, and the constraint attributes define allowable grant signals for the corresponding region, and wherein the requirement attributes comprise an identification of allowable master logic units within the test environment that that region can issue the grant signal to.

44. A test component as claimed in claim 43, wherein at least one of said regions within the selected logical group defines a plurality of possible further processing options available in order to determine the constraint attributes to be used by the generation logic, and the requirement attributes of said at least one region have decision attributes associated therewith defining a decision to be made if that region is selected in order to choose between said plurality of possible further processing options.

45. A test component as claimed in claim 44, wherein said decision attributes identify the further processing options to perform dependent on which master logic unit is requesting access to the bus.

46. A test component as claimed in claim 40, wherein said selection logic is operable to make a random selection of a region within the selected logical group based on the predetermined criteria.

47. A test component as claimed in claim 40, wherein at least one of said regions within the selected logical group defines a plurality of possible further processing options available in order to determine the constraint attributes to be used by said generation logic, and the attributes of said at least one of said regions comprise decision attributes define a decision to be made if that region is selected in order to choose between said plurality of possible further processing options.

48. A test component as claimed in claim 47, wherein said decision attributes define criteria in which a further selection of regions within another logical group is required by said selection logic in order to select said one of said number of regions whose constraint attributes are to be used by the generation logic.

49. A test component as claimed in claim 47, wherein said at least one of said regions has one or more sets of constraint attributes, and the decision attributes define criteria in which one of said sets of constraint attributes should be used by the generation logic.

50. A test component as claimed in claim 40, wherein the configuration file comprises a single logical group, and each region in said plurality specifies constraint attributes.

51. A test component as claimed in claim 38, wherein the plurality of regions in the configuration file are organised in a tree structure having a plurality of levels, each level containing one or more of said regions in one or more logical groups, such that at least one of the number of regions at a first level of the tree structure is a parent region having one or more child regions depending therefrom at a lower level of the tree structure, the test component further comprising:

tree pointer logic operable, following generation of the test sequence, to update a tree pointer identifying a current level in the tree, such that if the test sequence was generated based on the constraint attributes of a said parent region, the tree pointer then points to a lower level of the tree containing the one or more child regions, thereby ensuring that when the next test sequence is required, said selection logic is operable to begin the selection from said one or more child regions provided by the configuration file.

52. A test component as claimed in claim 38, wherein the test component is a master test component operable to issue as the test sequence a transfer request, and the constraint attributes define allowable transfer requests for the corresponding region.

53. A test component as claimed in claim 52, wherein the constraint attributes define an address range for allowable transfer requests and one or more allowable transfer types.

54. A test component as claimed in claim 53, wherein the constraint attributes further define one or more allowable burst types.

55. A test component as claimed in claim 54, wherein if the burst type used to generate the test sequence specifies multiple transfer requests, said generation logic is operable to generate as the test sequence each of the transfer requests specified by the burst type.

56. A test component as claimed in claim 52, wherein each region specifies constraint attributes.

57. A test component as claimed in claim 38, wherein the test component is a slave test component operable to issue as the test sequence a response to a transfer request, and the constraint attributes define allowable responses for the corresponding region.

58. A test component as claimed in claim 57, wherein the constraint attributes define one or more allowable response types.

59. A test component as claimed in claim 58, wherein the constraint attributes further define any allowable wait cycles.

60. A test component as claimed in claim 58, wherein the constraint attributes further define allowable data for the response.

61. A test component as claimed in claim 57, wherein each region specifies constraint attributes.

62. A test component as claimed in claim 38, wherein the test component is a bus interconnect test component operable to issue as the test sequence signals to be generated by the bus interconnect itself, and the constraint attributes define allowable signal values for the corresponding region.

63. A test component as claimed in claim 62, wherein the test sequence comprises one or more grant signals granting access to the bus to the device under test, and the constraint attributes define allowable grant signals for the corresponding region.

64. A test component as claimed in claim 63, wherein the test environment includes a plurality of master logic units that can access the bus, at least one of said master logic units being the device under test, and said constraint attributes define to which master logic unit the grant signal is to be issued.

65. A test component as claimed in claim 64, wherein the constraint attributes further define how long the granted master logic unit will be granted access to the bus.

66. A test component as claimed in claim 62, wherein the test sequence comprises one or more bus wait signals to the device under test, and the constraint attributes define allowable select signals for the corresponding region.

67. A test component as claimed in claim 62, wherein the test sequence comprises one or more bus wait signals to the device under test, and the constraint attributes define allowable bus wait signals for the corresponding region.

68. A test component as claimed in claim 62, wherein each region specifies constraint attributes.

69. A test component as claimed in claim 38, wherein the selection logic and generation logic are invoked a plurality of times to cause multiple test sequences to be issued over the bus to the device under test until a desired level of coverage has been obtained.

70. A test component as claimed in claim 69, wherein the plurality of regions in the configuration file are organised in one or more logical groups, each logical group containing one or more of said regions, and wherein each region has a weighting value associated therewith, and said selection logic is operable to select a said logical group, and to use as the predetermined criteria at least the weighting values of regions within the selected logical group, the test component further comprising:

means for monitoring the level of coverage obtained to identify a gap in coverage, and upon identification of a gap in coverage, altering the weighting values associated with the regions to increase the likelihood of that gap being covered during a subsequent iteration of the processes performed by the selection logic and the generation logic.

71. A test component as claimed in claim 70, wherein if the gap in coverage is a region that has not been used to generate a test sequence, then the means for monitoring is operable to alter the weighting values by increasing the weighting value of that region relative to the weighting values of other regions.

72. A test component as claimed in claim 70, wherein the test component is a master test component operable to issue as the test sequence a transfer request, and the constraint attributes define allowable transfer requests for the corresponding region, and if the gap in coverage relates to an access to a particular slave component, then the means for monitoring is operable to alter the weighting values by increasing the weighting value of those region or regions that have constraint attributes defining an address range for that slave component.

73. A test component as claimed in claim 38, wherein the device under test comprises at least a bus interconnect block.

\* \* \* \* \*